United States Patent
Filippini et al.

(10) Patent No.: US 9,071,848 B2
(45) Date of Patent: Jun. 30, 2015

(54) SUB-BAND VIDEO CODING ARCHITECTURE FOR PACKET BASED TRANSMISSION

(75) Inventors: Gianluca Filippini, Los Gatos, CA (US); James F. Dougherty, III, Morgan Hill, CA (US); William S. Bunch, Menlo Park, CA (US)

(73) Assignee: Broadcom Corporation, Irvine, CA (US)

( * ) Notice: Subject to any disclaimer, the term of this patent is extended or adjusted under 35 U.S.C. 154(b) by 443 days.

(21) Appl. No.: 13/420,703

(22) Filed: Mar. 15, 2012

(65) Prior Publication Data

US 2012/0236939 A1    Sep. 20, 2012

Related U.S. Application Data

(60) Provisional application No. 61/453,117, filed on Mar. 15, 2011.

(51) Int. Cl.
| | |
|---|---|
| H04N 7/12 | (2006.01) |
| H04N 19/59 | (2014.01) |
| H04N 19/70 | (2014.01) |
| H04N 19/30 | (2014.01) |
| H04N 19/63 | (2014.01) |
| H04N 19/61 | (2014.01) |

(52) U.S. Cl.
CPC ............ *H04N 19/59* (2014.11); *H04N 19/70* (2014.11); *H04N 19/30* (2014.11); *H04N 19/63* (2014.11); *H04N 19/61* (2014.11)

(58) Field of Classification Search
USPC .................................................. 375/240.14
See application file for complete search history.

(56) References Cited

U.S. PATENT DOCUMENTS

| | | | | |
|---|---|---|---|---|
| 5,067,015 A | * | 11/1991 | Combridge et al. | 375/240.11 |
| 6,144,365 A | * | 11/2000 | Young et al. | 345/600 |
| 6,263,024 B1 | * | 7/2001 | Matsumoto | 375/240.16 |
| 6,658,057 B1 | * | 12/2003 | Chen et al. | 375/240 |
| 2007/0297507 A1 | * | 12/2007 | Kim | 375/240.03 |
| 2010/0279681 A1 | * | 11/2010 | Ahmad et al. | 455/424 |
| 2012/0026288 A1 | * | 2/2012 | Tourapis et al. | 348/43 |

* cited by examiner

*Primary Examiner* — Tracy Li

(74) *Attorney, Agent, or Firm* — Garlick & Markison; Shayne X. Short

(57) ABSTRACT

Sub-band video coding architecture for packet based transmission. Video processing includes converting of a frame or picture of a video signal into a number of respective sub-bands or sub-frames (e.g., such that each respective one is a respective subsampled version of an original frame or picture) and subsequent assembly thereof into a reconstructed frame or picture. The reconstructed frame or picture then undergoes video encoding to generate an output bitstream that may subsequently undergo appropriate processing (e.g., packetization, continuous time signal generation, etc.) to generate a signal for transmission via one or more communication the links. Characteristics associated with each respective sub-band or sub-frame may be similar (e.g., similar characteristics) or different (e.g., two or more sub-bands or sub-frames have different characteristics, such as different respective number of pixels, aspect ratios, etc.). Respective sub-frames may undergo video encoding and transmission.

20 Claims, 27 Drawing Sheets

SUB-BAND VIDEO CODING ARCHITECTURE FOR PACKET BASED TRANSMISSION

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Patent Application Ser. No. 61/453,117, entitled "Sub-band video coding architecture for packet based transmission," filed Mar. 15, 2011.

INCORPORATION BY REFERENCE

The following standards/draft standards are hereby incorporated herein by reference in their entirety and are made part of the present U.S. Utility Patent Application for all purposes:

1. "WD5: Working Draft 5 of High-Efficiency Video Coding, Joint Collaborative Team on Video Coding (JCT-VC)," Joint Collaborative Team on Video Coding (JCT-VC) of ITU-T SG16 WP3 and ISO/IEC JTC1/SC29/WG11 7th Meeting: Geneva, CH, 21-30 Nov., 2011, Document: JCTVC-G1103_d6, 225 pages.

2. International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent.

BACKGROUND OF THE INVENTION

1. Technical Field of the Invention

The invention relates generally to communication systems; and, more particularly, it relates to video coding as performed within such communication systems.

2. Description of Related Art

Data communication systems have been under continual development for many years. Such a communication systems may be implemented in accordance with a variety of signaling schemes. One particular type of communication system, packet-based communication systems, may be viewed from certain perspectives as being relatively more susceptible to degradation in service of quality as compared to other types of communication systems. For example, when dealing with signaling from a first communication device to one or more other communication devices, and particularly when such signaling is time sensitive (e.g., voice, media such as audio and/or video, etc.), certain degradation in one or more communication links associated with such a communication system may deleteriously affect a user's perceptual quality. Considering an example of a lossy communication channel within a packet-based communication system, when one or more packets of a given communication are lost, often times the perceptual quality is correspondingly degraded. From certain perspectives, packet-based communication systems may be viewed as having relatively greater sensitivity to degradation and communication link quality, in that, in the event that one or more packets are lost during transmission from a first communication device to one or more other mutation devices, the perceptual effect is of such significance that a user experience is significantly compromised. The present art does not satisfactorily present a means by which the deleterious effects of packet loss may be handled in such a way as to ensure a relatively high user perceptual quality and experience.

DETAILED DESCRIPTION OF THE INVENTION

Figure 1:
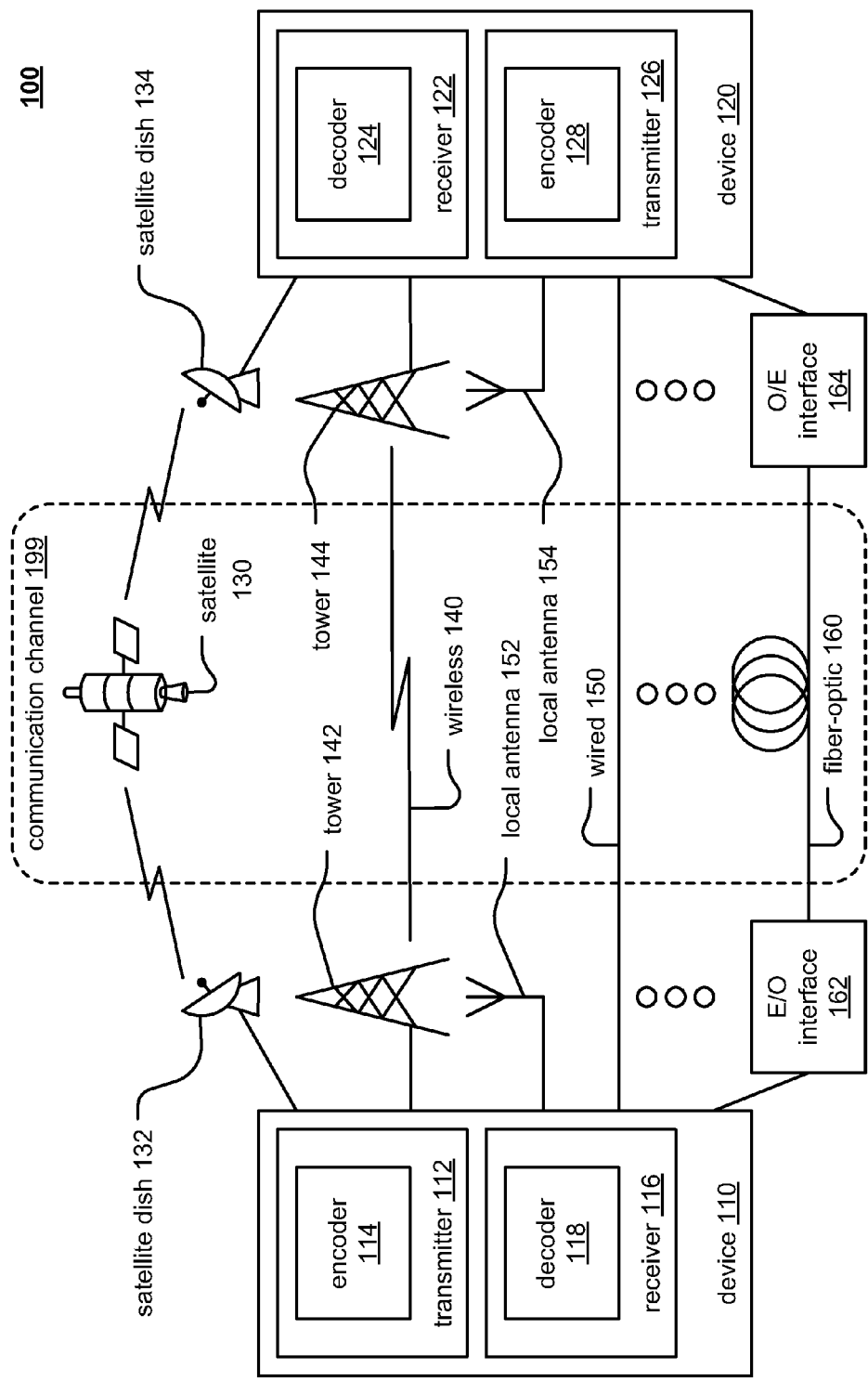
FIG. 1 and FIG. 2 illustrate various embodiments of communication systems.

Within many devices that use digital media such as digital video, respective images thereof, being digital in nature, are represented using pixels. Within certain communication systems, digital media can be transmitted from a first location to a second location at which such media can be output or displayed. The goal of digital communications systems, including those that operate to communicate digital video, is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media as well.

Figure 2:
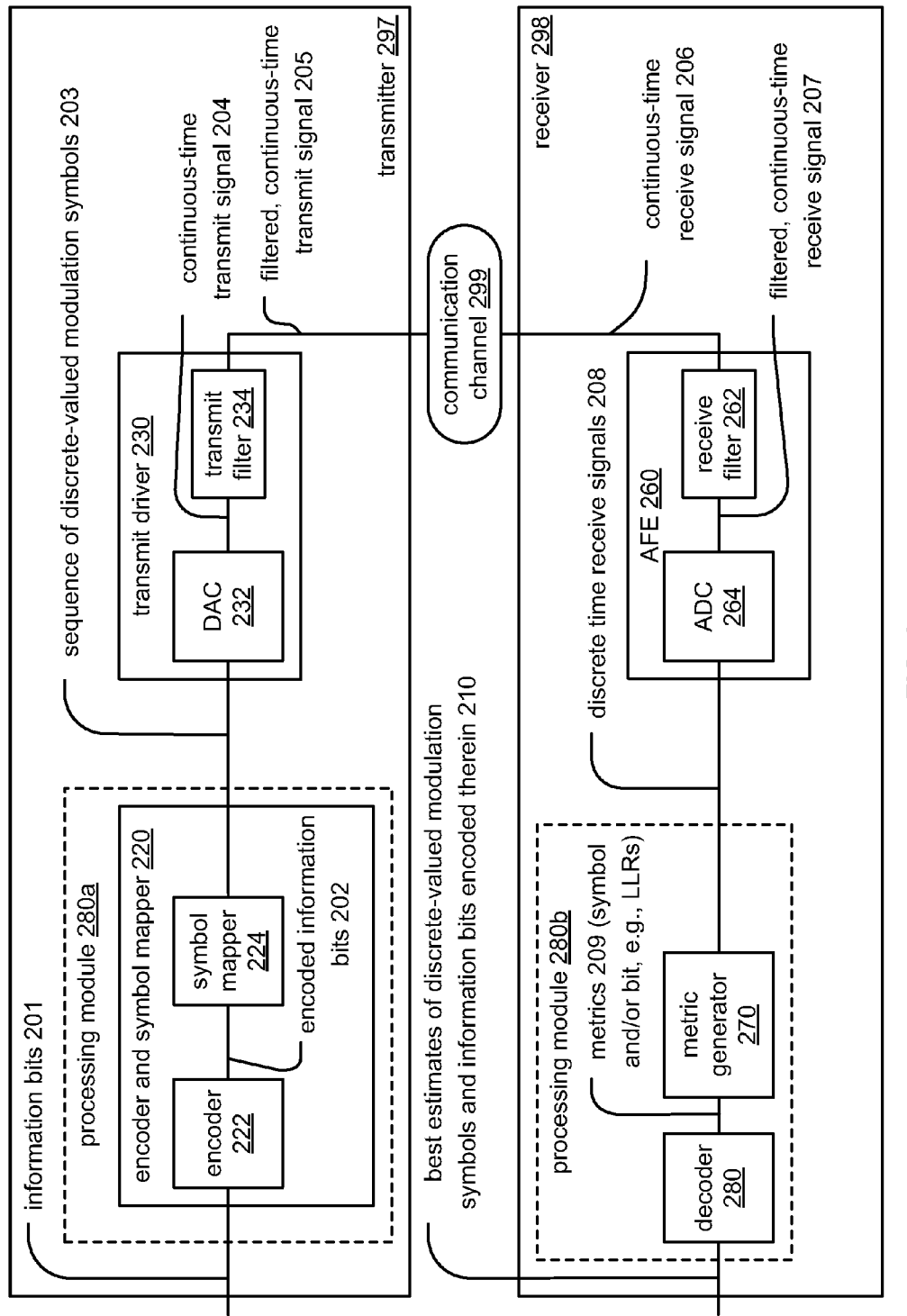

FIG. 1 and FIG. 2 illustrate various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Digital image and/or video processing of digital images and/or media (including the respective images within a digital video signal) may be performed by any of the various devices depicted below in FIG. 3A-3H to allow a user to view such digital images and/or video. These various devices do not include an exhaustive list of devices in which the image and/or video processing described herein may be effectuated, and it is noted that any generic digital image and/or video processing device may be implemented to perform the processing described herein without departing from the scope and spirit of the invention.

Figure 3:
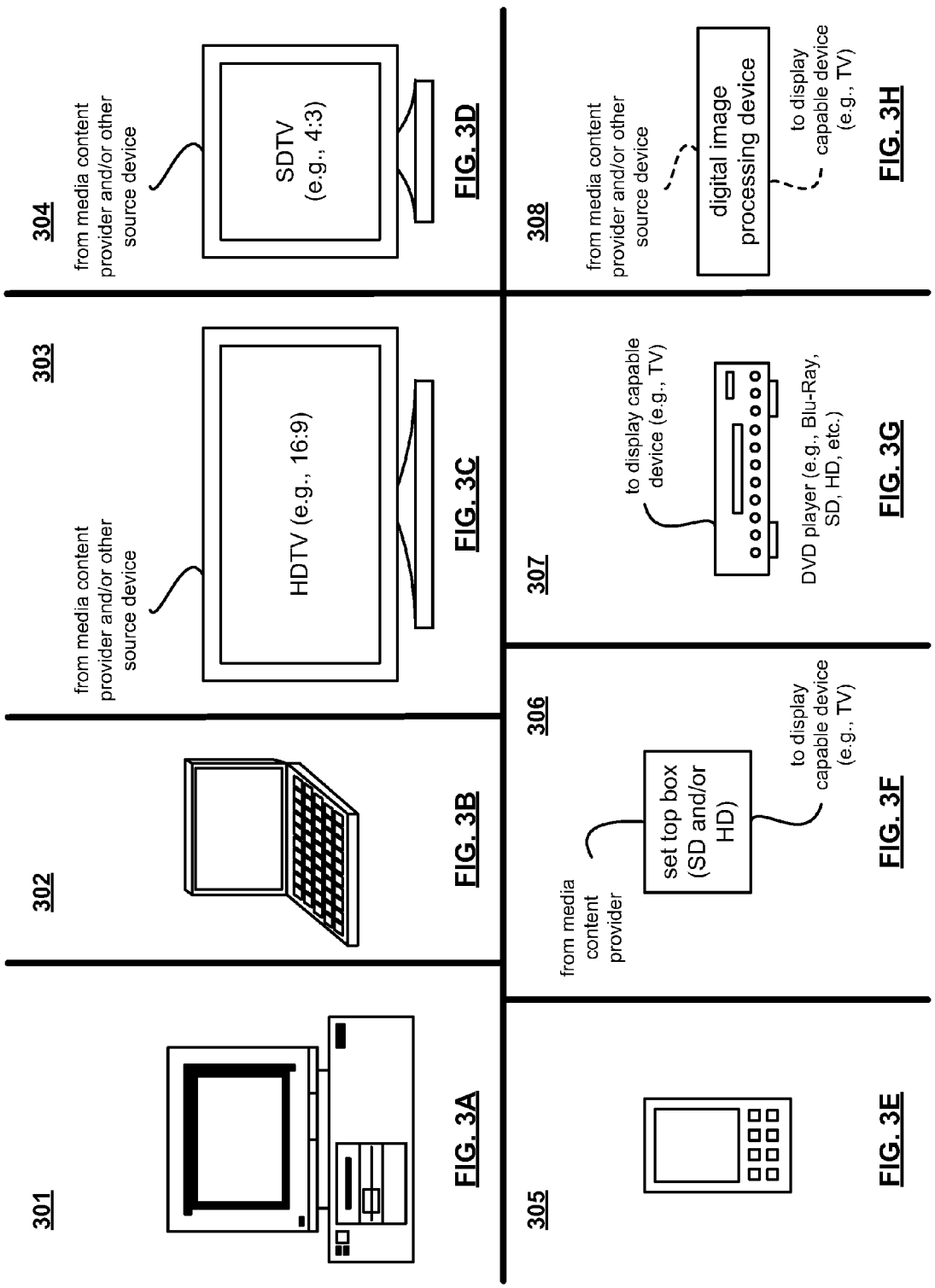
FIG. 3A illustrates an embodiment of a computer.
FIG. 3B illustrates an embodiment of a laptop computer.
FIG. 3C illustrates an embodiment of a high definition (HD) television.
FIG. 3D illustrates an embodiment of a standard definition (SD) television.
FIG. 3E illustrates an embodiment of a handheld media unit.
FIG. 3F illustrates an embodiment of a set top box (STB).
FIG. 3G illustrates an embodiment of a digital video disc (DVD) player.
FIG. 3H illustrates an embodiment of a generic digital image and/or video processing device.

FIG. 3A illustrates an embodiment of a computer 301. The computer 301 can be a desktop computer, or an enterprise storage devices such a server, of a host computer that is attached to a storage array such as a redundant array of independent disks (RAID) array, storage router, edge router, storage switch and/or storage director. A user is able to view still digital images and/or video (e.g., a sequence of digital images) using the computer 301. Oftentimes, various image and/or video viewing programs and/or media player programs are included on a computer 301 to allow a user to view such images (including video).

FIG. 3B illustrates an embodiment of a laptop computer 302. Such a laptop computer 302 may be found and used in any of a wide variety of contexts. In recent years, with the ever-increasing processing capability and functionality found within laptop computers, they are being employed in many instances where previously higher-end and more capable desktop computers would be used. As with the computer 301, the laptop computer 302 may include various image viewing programs and/or media player programs to allow a user to view such images (including video).

FIG. 3C illustrates an embodiment of a high definition (HD) television 303. Many HD televisions 303 include an integrated tuner to allow the receipt, processing, and decoding of media content (e.g., television broadcast signals) thereon. Alternatively, sometimes an HD television 303 receives media content from another source such as a digital video disc (DVD) player, set top box (STB) that receives, processes, and decodes a cable and/or satellite television broadcast signal. Regardless of the particular implementation, the HD television 303 may be implemented to perform image and/or video processing as described herein. Generally speaking, an HD television 303 has capability to display HD media content and oftentimes is implemented having a 16:9 widescreen aspect ratio.

FIG. 3D illustrates an embodiment of a standard definition (SD) television 304. Of course, an SD television 304 is somewhat analogous to an HD television 303, with at least one difference being that the SD television 304 does not include capability to display HD media content, and an SD television 304 oftentimes is implemented having a 4:3 full screen aspect ratio. Nonetheless, even an SD television 304 may be implemented to perform image and/or video processing as described herein.

FIG. 3E illustrates an embodiment of a handheld media unit 305. A handheld media unit 305 may operate to provide general storage or storage of image/video content information such as joint photographic experts group (JPEG) files, tagged image file format (TIFF), bitmap, motion picture experts group (MPEG) files, Windows Media (WMA/WMV) files, other types of video content such as MPEG4 files, etc. for playback to a user, and/or any other type of information that may be stored in a digital format. Historically, such handheld media units were primarily employed for storage and playback of audio media; however, such a handheld media unit 305 may be employed for storage and playback of virtual any media (e.g., audio media, video media, photographic media, etc.). Moreover, such a handheld media unit 305 may also include other functionality such as integrated communication circuitry for wired and wireless communications. Such a handheld media unit 305 may be implemented to perform image and/or video processing as described herein.

FIG. 3F illustrates an embodiment of a set top box (STB) 306. As mentioned above, sometimes a STB 306 may be implemented to receive, process, and decode a cable and/or satellite television broadcast signal to be provided to any appropriate display capable device such as SD television 304 and/or HD television 303. Such an STB 306 may operate independently or cooperatively with such a display capable device to perform image and/or video processing as described herein.

FIG. 3G illustrates an embodiment of a digital video disc (DVD) player 307. Such a DVD player may be a Blu-Ray DVD player, an HD capable DVD player, an SD capable DVD player, an up-sampling capable DVD player (e.g., from SD to HD, etc.) without departing from the scope and spirit of the invention. The DVD player may provide a signal to any appropriate display capable device such as SD television 304 and/or HD television 303. The DVD player 305 may be implemented to perform image and/or video processing as described herein.

FIG. 3H illustrates an embodiment of a generic digital image and/or video processing device 308. Again, as mentioned above, these various devices described above do not include an exhaustive list of devices in which the image and/or video processing described herein may be effectuated, and it is noted that any generic digital image and/or video processing device 308 may be implemented to perform the image and/or video processing described herein without departing from the scope and spirit of the invention.

Figure 4:
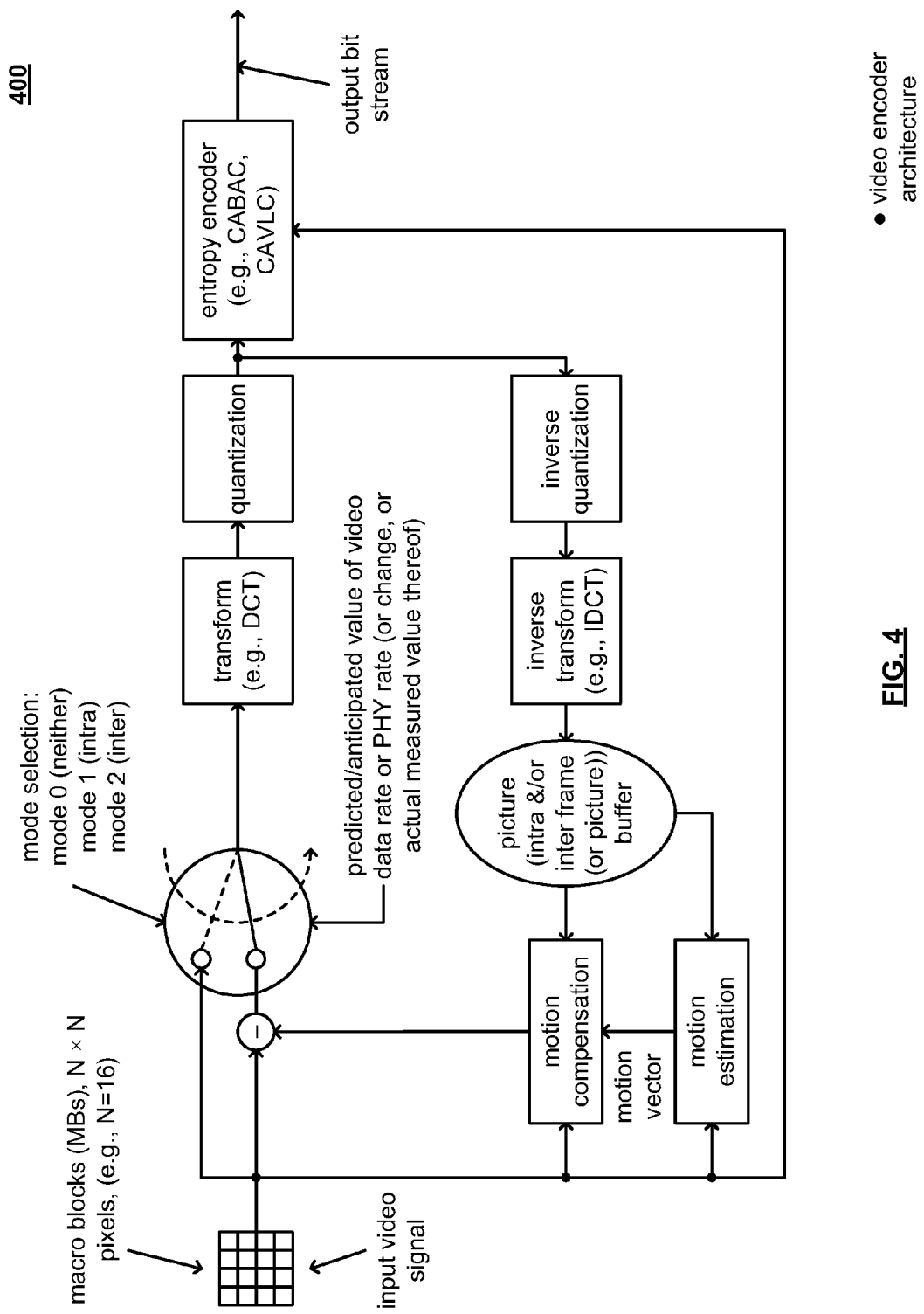
FIG. 4, FIG. 5, and FIG. 6 are diagrams illustrating various embodiments of video encoding architectures.
Figure 5:
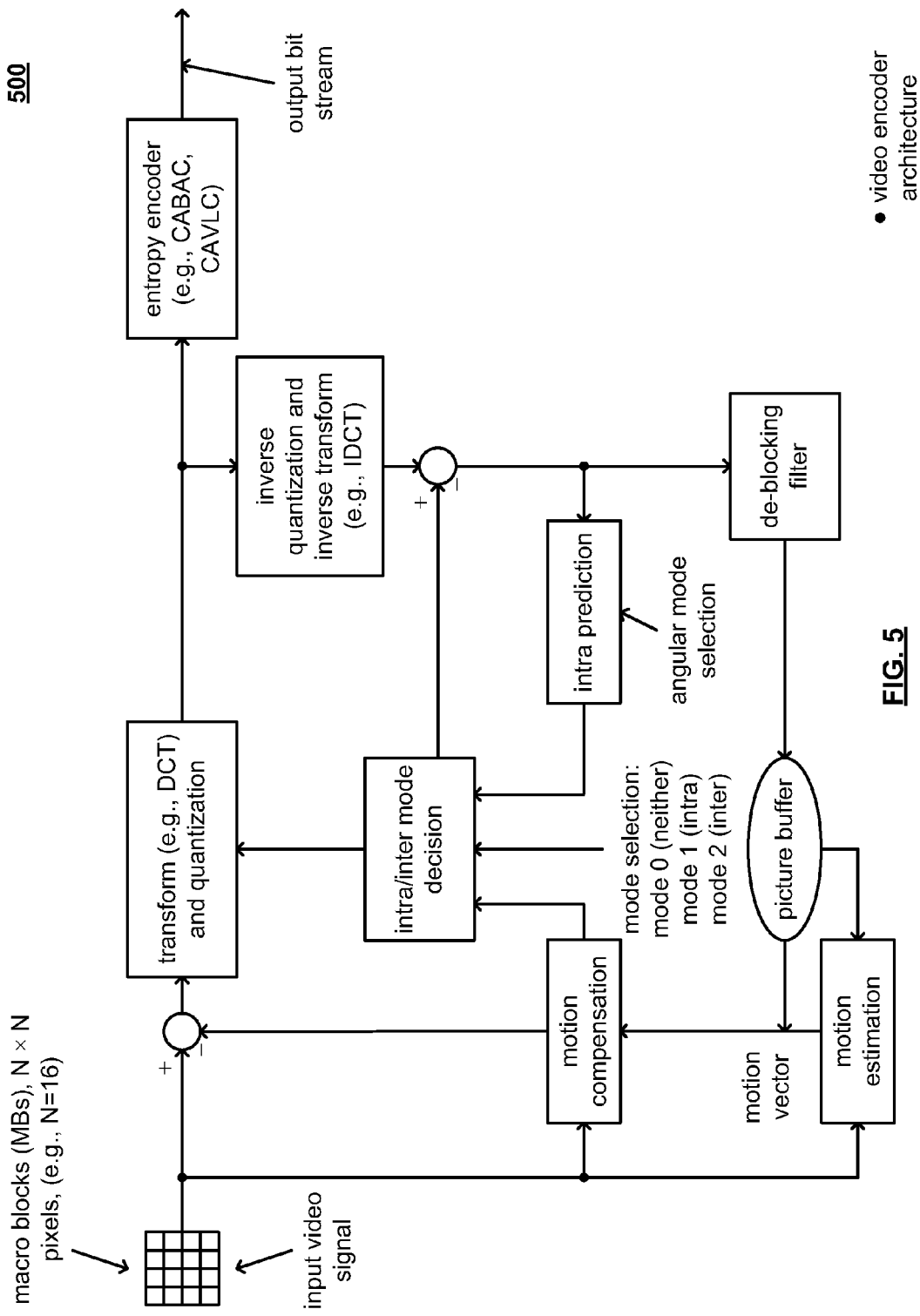
Figure 6:
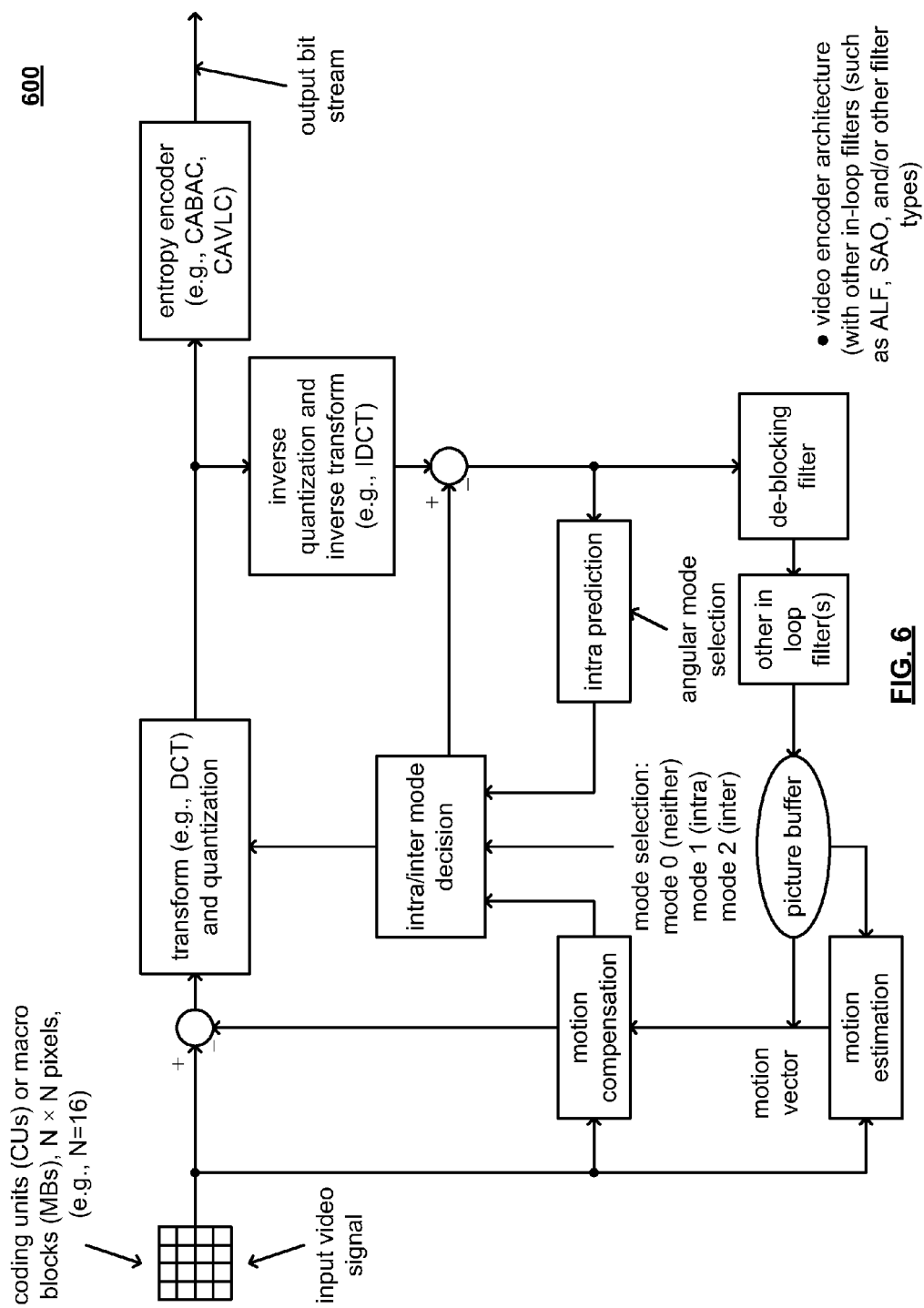

FIG. 4, FIG. 5, and FIG. 6 are diagrams illustrating various embodiments 400 and 500, and 600, respectively, of video encoding architectures.

Referring to embodiment 400 of FIG. 4, as may be seen with respect to this diagram, an input video signal is received by a video encoder. In certain embodiments, the input video signal is composed of coding units (CUs) or macro-blocks (MBs). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

A picture buffer, alternatively referred to as a digital picture buffer or a DPB, receives the signal from the IDCT module; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 500 of FIG. 5, as may be seen with respect to this diagram, an input video signal is received by a video encoder. In certain embodiments, the input video signal is composed of coding units or macro-blocks (and/or may be partitioned into coding units (CUs)). The size of such coding units or macro-blocks may be varied and can include a number of pixels typically arranged in a square shape. In one embodiment, such coding units or macro-blocks have a size of 16×16 pixels. However, it is generally noted that a macro-block may have any desired size such as N×N pixels, where N is an integer. Of course, some implementations may include non-square shaped coding units or macro-blocks, although square shaped coding units or macro-blocks are employed in a preferred embodiment.

The input video signal may generally be referred to as corresponding to raw frame (or picture) image data. For example, raw frame (or picture) image data may undergo processing to generate luma and chroma samples. In some embodiments, the set of luma samples in a macro-block is of one particular arrangement (e.g., 16×16), and set of the chroma samples is of a different particular arrangement (e.g., 8×8). In accordance with the embodiment depicted herein, a video encoder processes such samples on a block by block basis.

The input video signal then undergoes mode selection by which the input video signal selectively undergoes intra and/or inter-prediction processing. Generally speaking, the input video signal undergoes compression along a compression pathway. When operating with no feedback (e.g., in accordance with neither inter-prediction nor intra-prediction), the input video signal is provided via the compression pathway to undergo transform operations (e.g., in accordance with discrete cosine transform (DCT)). Of course, other transforms may be employed in alternative embodiments. In this mode of operation, the input video signal itself is that which is compressed. The compression pathway may take advantage of the lack of high frequency sensitivity of human eyes in performing the compression.

However, feedback may be employed along the compression pathway by selectively using inter- or intra-prediction video encoding. In accordance with a feedback or predictive mode of operation, the compression pathway operates on a (relatively low energy) residual (e.g., a difference) resulting from subtraction of a predicted value of a current macro-block from the current macro-block. Depending upon which form of prediction is employed in a given instance, a residual or difference between a current macro-block and a predicted value of that macro-block based on at least a portion of that same frame (or picture) or on at least a portion of at least one other frame (or picture) is generated.

The resulting modified video signal then undergoes transform operations along the compression pathway. In one embodiment, a discrete cosine transform (DCT) operates on a set of video samples (e.g., luma, chroma, residual, etc.) to compute respective coefficient values for each of a predetermined number of basis patterns. For example, one embodiment includes 64 basis functions (e.g., such as for an 8×8 sample). Generally speaking, different embodiments may employ different numbers of basis functions (e.g., different transforms). Any combination of those respective basis functions, including appropriate and selective weighting thereof, may be used to represent a given set of video samples. Additional details related to various ways of performing transform operations are described in the technical literature associated with video encoding including those standards/draft standards that have been incorporated by reference as indicated above. The output from the transform processing includes such respective coefficient values. This output is provided to a quantizer.

Generally, most image blocks will typically yield coefficients (e.g., DCT coefficients in an embodiment operating in accordance with discrete cosine transform (DCT)) such that the most relevant DCT coefficients are of lower frequencies. Because of this and of the human eyes' relatively poor sensitivity to high frequency visual effects, a quantizer may be operable to convert most of the less relevant coefficients to a value of zero. That is to say, those coefficients whose relative contribution is below some predetermined value (e.g., some threshold) may be eliminated in accordance with the quantization process. A quantizer may also be operable to convert the significant coefficients into values that can be coded more efficiently than those that result from the transform process. For example, the quantization process may operate by dividing each respective coefficient by an integer value and discarding any remainder. Such a process, when operating on typical coding units or macro-blocks, typically yields a relatively low number of non-zero coefficients which are then delivered to an entropy encoder for lossless encoding and for use in accordance with a feedback path which may select intra-prediction and/or inter-prediction processing in accordance with video encoding.

An entropy encoder operates in accordance with a lossless compression encoding process. In comparison, the quantization operations are generally lossy. The entropy encoding process operates on the coefficients provided from the quantization process. Those coefficients may represent various characteristics (e.g., luma, chroma, residual, etc.). Various types of encoding may be employed by an entropy encoder. For example, context-adaptive binary arithmetic coding (CABAC) and/or context-adaptive variable-length coding (CAVLC) may be performed by the entropy encoder. For example, in accordance with at least one part of an entropy coding scheme, the data is converted to a (run, level) pairing (e.g., data 14, 3, 0, 4, 0, 0, −3 would be converted to the respective (run, level) pairs of (0, 14), (0, 3), (1, 4), (2, −3)). In advance, a table may be prepared that assigns variable length codes for value pairs, such that relatively shorter length codes are assigned to relatively common value pairs, and relatively longer length codes are assigned for relatively less common value pairs.

As the reader will understand, the operations of inverse quantization and inverse transform correspond to those of quantization and transform, respectively. For example, in an embodiment in which a DCT is employed within the transform operations, then an inverse DCT (IDCT) is that employed within the inverse transform operations.

An adaptive loop filter (ALF) is implemented to process the output from the inverse transform block. Such an adaptive loop filter (ALF) is applied to the decoded picture before it is stored in a picture buffer (sometimes referred to as a DPB, digital picture buffer). The adaptive loop filter (ALF) is implemented to reduce coding noise of the decoded picture, and the filtering thereof may be selectively applied on a slice by slice basis, respectively, for luminance and chrominance whether or not the adaptive loop filter (ALF) is applied either at slice level or at block level. Two-dimensional 2-D finite impulse response (FIR) filtering may be used in application of the adaptive loop filter (ALF). The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment operates by generating the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an adaptive loop filter (ALF), there may be some increasing complexity within encoder implemented within the transmitter communication device as well as within a decoder implemented within a receiver communication device.

In certain optional embodiments, the output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, such an ALF is applied to the decoded picture before it is stored in a picture buffer (again, sometimes alternatively referred to as a DPB, digital picture buffer). Such an ALF is implemented to reduce coding noise of the decoded picture, and the filtering thereof may be selectively applied on a slice by slice basis, respectively, for luminance and chrominance whether or not such an ALF is applied either at slice level or at block level. Two-dimensional 2-D finite impulse response (FIR) filtering may be used in application of such an ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment is operative to generate the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to one type of an in-loop filter, the use of an adaptive loop filter (ALF) can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with adaptive loop filter (ALF) processing.

Receiving the signal output from the ALF is a picture buffer, alternatively referred to as a digital picture buffer or a DPB; the picture buffer is operative to store the current frame (or picture) and/or one or more other frames (or pictures) such as may be used in accordance with intra-prediction and/or inter-prediction operations as may be performed in accordance with video encoding. It is noted that in accordance with intra-prediction, a relatively small amount of storage may be sufficient, in that, it may not be necessary to store the current frame (or picture) or any other frame (or picture) within the frame (or picture) sequence. Such stored information may be employed for performing motion compensation and/or motion estimation in the case of performing inter-prediction in accordance with video encoding.

In one possible embodiment, for motion estimation, a respective set of luma samples (e.g., 16×16) from a current frame (or picture) are compared to respective buffered counterparts in other frames (or pictures) within the frame (or picture) sequence (e.g., in accordance with inter-prediction). In one possible implementation, a closest matching area is located (e.g., prediction reference) and a vector offset (e.g., motion vector) is produced. In a single frame (or picture), a number of motion vectors may be found and not all will necessarily point in the same direction. One or more operations as performed in accordance with motion estimation are operative to generate one or more motion vectors.

Motion compensation is operative to employ one or more motion vectors as may be generated in accordance with motion estimation. A prediction reference set of samples is identified and delivered for subtraction from the original input video signal in an effort hopefully to yield a relatively (e.g., ideally, much) lower energy residual. If such operations do not result in a yielded lower energy residual, motion compensation need not necessarily be performed and the transform operations may merely operate on the original input video signal instead of on a residual (e.g., in accordance with an operational mode in which the input video signal is provided straight through to the transform operation, such that neither intra-prediction nor inter-prediction are performed), or intra-prediction may be utilized and transform operations performed on the residual resulting from intra-prediction. Also, if the motion estimation and/or motion compensation operations are successful, the motion vector may also be sent to the entropy encoder along with the corresponding residual's coefficients for use in undergoing lossless entropy encoding.

The output from the overall video encoding operation is an output bit stream. It is noted that such an output bit stream may of course undergo certain processing in accordance with generating a continuous time signal which may be transmitted via a communication channel. For example, certain embodiments operate within wireless communication systems. In such an instance, an output bitstream may undergo appropriate digital to analog conversion, frequency conversion, scaling, filtering, modulation, symbol mapping, and/or any other operations within a wireless communication device that operate to generate a continuous time signal capable of being transmitted via a communication channel, etc.

Referring to embodiment 600 of FIG. 6, with respect to this diagram depicting an alternative embodiment of a video encoder, such a video encoder carries out prediction, transform, and encoding processes to produce a compressed output bit stream. Such a video encoder may operate in accordance with and be compliant with one or more video encoding protocols, standards, and/or recommended practices such as ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC.

It is noted that a corresponding video decoder, such as located within a device at another end of a communication channel, is operative to perform the complementary processes of decoding, inverse transform, and reconstruction to produce a respective decoded video sequence that is (ideally) representative of the input video signal.

As may be seen with respect to this diagram, alternative arrangements and architectures may be employed for effectuating video encoding. Generally speaking, an encoder processes an input video signal (e.g., typically composed in units of coding units or macro-blocks, often times being square in shape and including N×N pixels therein). The video encoding determines a prediction of the current macro-block based on previously coded data. That previously coded data may come from the current frame (or picture) itself (e.g., such as in accordance with intra-prediction) or from one or more other frames (or pictures) that have already been coded (e.g., such as in accordance with inter-prediction). The video encoder subtracts the prediction of the current macro-block to form a residual.

Generally speaking, intra-prediction is operative to employ block sizes of one or more particular sizes (e.g., 16×16, 8×8, or 4×4) to predict a current macro-block from surrounding, previously coded pixels within the same frame (or picture). Generally speaking, inter-prediction is operative to employ a range of block sizes (e.g., 16×16 down to 4×4) to predict pixels in the current frame (or picture) from regions that are selected from within one or more previously coded frames (or pictures).

With respect to the transform and quantization operations, a block of residual samples may undergo transformation using a particular transform (e.g., 4×4 or 8×8). One possible embodiment of such a transform operates in accordance with discrete cosine transform (DCT). The transform operation outputs a group of coefficients such that each respective coefficient corresponds to a respective weighting value of one or more basis functions associated with a transform. After undergoing transformation, a block of transform coefficients is quantized (e.g., each respective coefficient may be divided by an integer value and any associated remainder may be discarded, or they may be multiplied by an integer value). The quantization process is generally inherently lossy, and it can reduce the precision of the transform coefficients according to a quantization parameter (QP). Typically, many of the coefficients associated with a given macro-block are zero, and only some nonzero coefficients remain. Generally, a relatively high QP setting is operative to result in a greater proportion of zero-valued coefficients and smaller magnitudes of non-zero coefficients, resulting in relatively high compression (e.g., relatively lower coded bit rate) at the expense of relatively poorly decoded image quality; a relatively low QP setting is operative to allow more nonzero coefficients to remain after quantization and larger magnitudes of non-zero coefficients, resulting in relatively lower compression (e.g., relatively higher coded bit rate) with relatively better decoded image quality.

The video encoding process produces a number of values that are encoded to form the compressed bit stream. Examples of such values include the quantized transform coefficients, information to be employed by a decoder to re-create the appropriate prediction, information regarding the structure of the compressed data and compression tools employed during encoding, information regarding a complete video sequence, etc. Such values and/or parameters (e.g., syntax elements) may undergo encoding within an entropy encoder operating in accordance with CABAC, CAVLC, or some other entropy coding scheme, to produce an output bit stream that may be stored, transmitted (e.g., after undergoing appropriate processing to generate a continuous time signal that comports with a communication channel), etc.

In an embodiment operating using a feedback path, the output of the transform and quantization undergoes inverse quantization and inverse transform. One or both of intra-prediction and inter-prediction may be performed in accordance with video encoding. Also, motion compensation and/or motion estimation may be performed in accordance with such video encoding.

The signal path output from the inverse quantization and inverse transform (e.g., IDCT) block, which is provided to the intra-prediction block, is also provided to a de-blocking filter. The output from the de-blocking filter is provided to one or more other in-loop filters (e.g., implemented in accordance with adaptive loop filter (ALF), sample adaptive offset (SAO) filter, and/or any other filter type) implemented to process the output from the inverse transform block. For example, in one possible embodiment, an ALF is applied to the decoded picture before it is stored in a picture buffer (again, sometimes alternatively referred to as a DPB, digital picture buffer). The ALF is implemented to reduce coding noise of the decoded picture, and the filtering thereof may be selectively applied on a slice by slice basis, respectively, for luminance and chrominance whether or not the ALF is applied either at slice level or at block level. Two-dimensional 2-D finite impulse response (FIR) filtering may be used in application of the ALF. The coefficients of the filters may be designed slice by slice at the encoder, and such information is then signaled to the decoder (e.g., signaled from a transmitter communication device including a video encoder [alternatively referred to as encoder] to a receiver communication device including a video decoder [alternatively referred to as decoder]).

One embodiment generated the coefficients in accordance with Wiener filtering design. In addition, it may be applied on a block by block based at the encoder whether the filtering is performed and such a decision is then signaled to the decoder (e.g., signaled from a transmitter communication device including a video encoder [alternatively referred to as encoder] to a receiver communication device including a video decoder [alternatively referred to as decoder]) based on quadtree structure, where the block size is decided according to the rate-distortion optimization. It is noted that the implementation of using such 2-D filtering may introduce a degree of complexity in accordance with both encoding and decoding. For example, by using 2-D filtering in accordance and implementation of an ALF, there may be some increasing complexity within encoder implemented within the transmitter communication device as well as within a decoder implemented within a receiver communication device.

As mentioned with respect to other embodiments, the use of an ALF can provide any of a number of improvements in accordance with such video processing, including an improvement on the objective quality measure by the peak to signal noise ratio (PSNR) that comes from performing random quantization noise removal. In addition, the subjective quality of a subsequently encoded video signal may be achieved from illumination compensation, which may be introduced in accordance with performing offset processing and scaling processing (e.g., in accordance with applying a gain) in accordance with ALF processing.

With respect to any video encoder architecture implemented to generate an output bitstream, it is noted that such architectures may be implemented within any of a variety of communication devices. The output bitstream may undergo additional processing including error correction code (ECC), forward error correction (FEC), etc. thereby generating a modified output bitstream having additional redundancy deal therein. Also, as may be understood with respect to such a digital signal, it may undergo any appropriate processing in accordance with generating a continuous time signal suitable for or appropriate for transmission via a communication channel. That is to say, such a video encoder architecture may be implemented within a communication device operative to perform transmission of one or more signals via one or more communication channels. Additional processing may be made on an output bitstream generated by such a video encoder architecture thereby generating a continuous time signal that may be launched into a communication channel.

Figure 7:
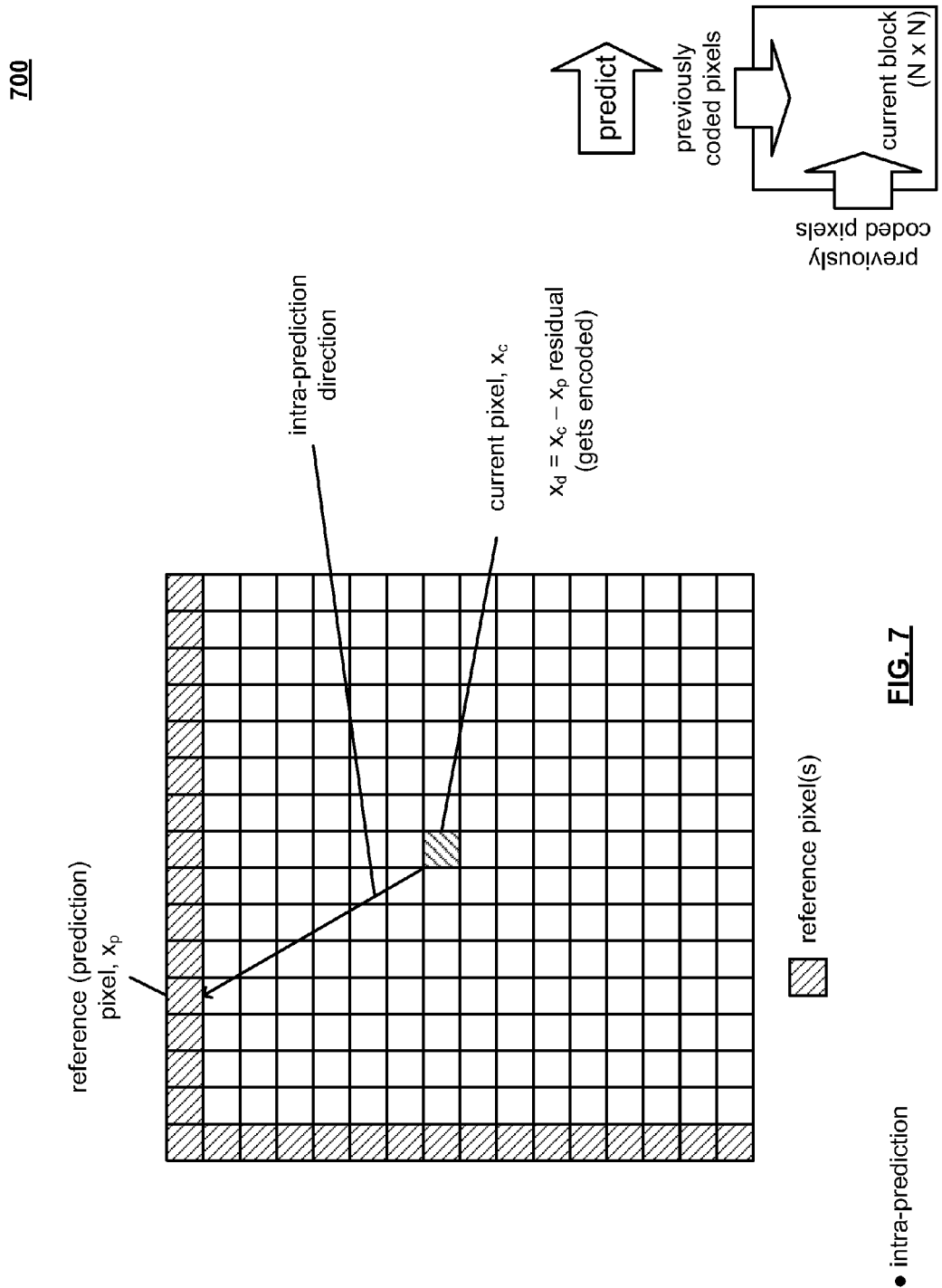
FIG. 7 is a diagram illustrating an embodiment of intra-prediction processing.

FIG. 7 is a diagram illustrating an embodiment 700 of intra-prediction processing. As can be seen with respect to this diagram, a current block of video data (e.g., often times being square in shape and including generally N×N pixels) undergoes processing to estimate the respective pixels therein. Previously coded pixels located above and to the left of the current block are employed in accordance with such intra-prediction. From certain perspectives, an intra-prediction direction may be viewed as corresponding to a vector extending from a current pixel to a reference pixel located above or to the left of the current pixel. Details of intra-prediction as applied to coding in accordance with H.264/AVC are specified within the corresponding standard (e.g., International Telecommunication Union, ITU-T, TELECOMMUNICATION STANDARDIZATION SECTOR OF ITU, H.264 (March 2010), SERIES H: AUDIOVISUAL AND MULTIMEDIA SYSTEMS, Infrastructure of audiovisual services—Coding of moving video, Advanced video coding for generic audiovisual services, Recommendation ITU-T H.264, also alternatively referred to as International Telecomm ISO/IEC 14496-10—MPEG-4 Part 10, AVC (Advanced Video Coding), H.264/MPEG-4 Part 10 or AVC (Advanced Video Coding), ITU H.264/MPEG4-AVC, or equivalent) that is incorporated by reference above.

The residual, which is the difference between the current pixel and the reference or prediction pixel, is that which gets encoded. As can be seen with respect to this diagram, intra-prediction operates using pixels within a common frame (or picture). It is of course noted that a given pixel may have different respective components associated therewith, and there may be different respective sets of samples for each respective component.

Figure 8:
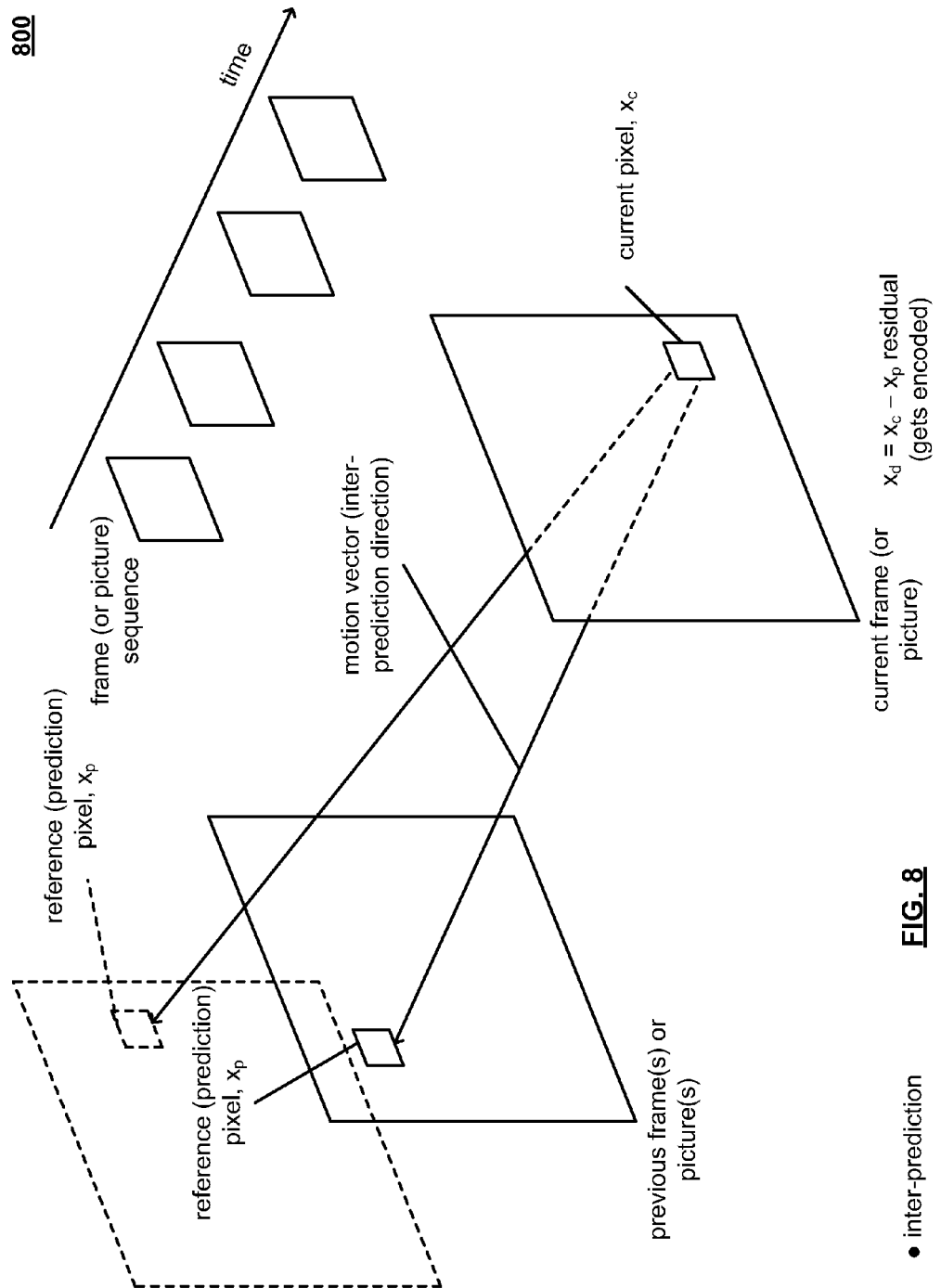
FIG. 8 is a diagram illustrating an embodiment of inter-prediction processing.

FIG. 8 is a diagram illustrating an embodiment 800 of inter-prediction processing. In contradistinction to intra-prediction, inter-prediction is operative to identify a motion vector (e.g., an inter-prediction direction) based on a current set of pixels within a current frame (or picture) and one or more sets of reference or prediction pixels located within one or more other frames (or pictures) within a frame (or picture) sequence. As can be seen, the motion vector extends from the current frame (or picture) to another frame (or picture) within the frame (or picture) sequence. Inter-prediction may utilize sub-pixel interpolation, such that a prediction pixel value corresponds to a function of a plurality of pixels in a reference frame or picture.

A residual may be calculated in accordance with inter-prediction processing, though such a residual is different from the residual calculated in accordance with intra-prediction processing. In accordance with inter-prediction processing, the residual at each pixel again corresponds to the difference between a current pixel and a predicted pixel value. However, in accordance with inter-prediction processing, the current pixel and the reference or prediction pixel are not located within the same frame (or picture). While this diagram shows inter-prediction as being employed with respect to one or more previous frames or pictures, it is also noted that alternative embodiments may operate using references corresponding to frames before and/or after a current frame. For example, in accordance with appropriate buffering and/or memory management, a number of frames may be stored. When operating on a given frame, references may be generated from other frames that precede and/or follow that given frame.

Coupled with the CU, a basic unit may be employed for the prediction partition mode, namely, the prediction unit, or PU. It is also noted that the PU is defined only for the last depth CU, and its respective size is limited to that of the CU.

Figure 9:
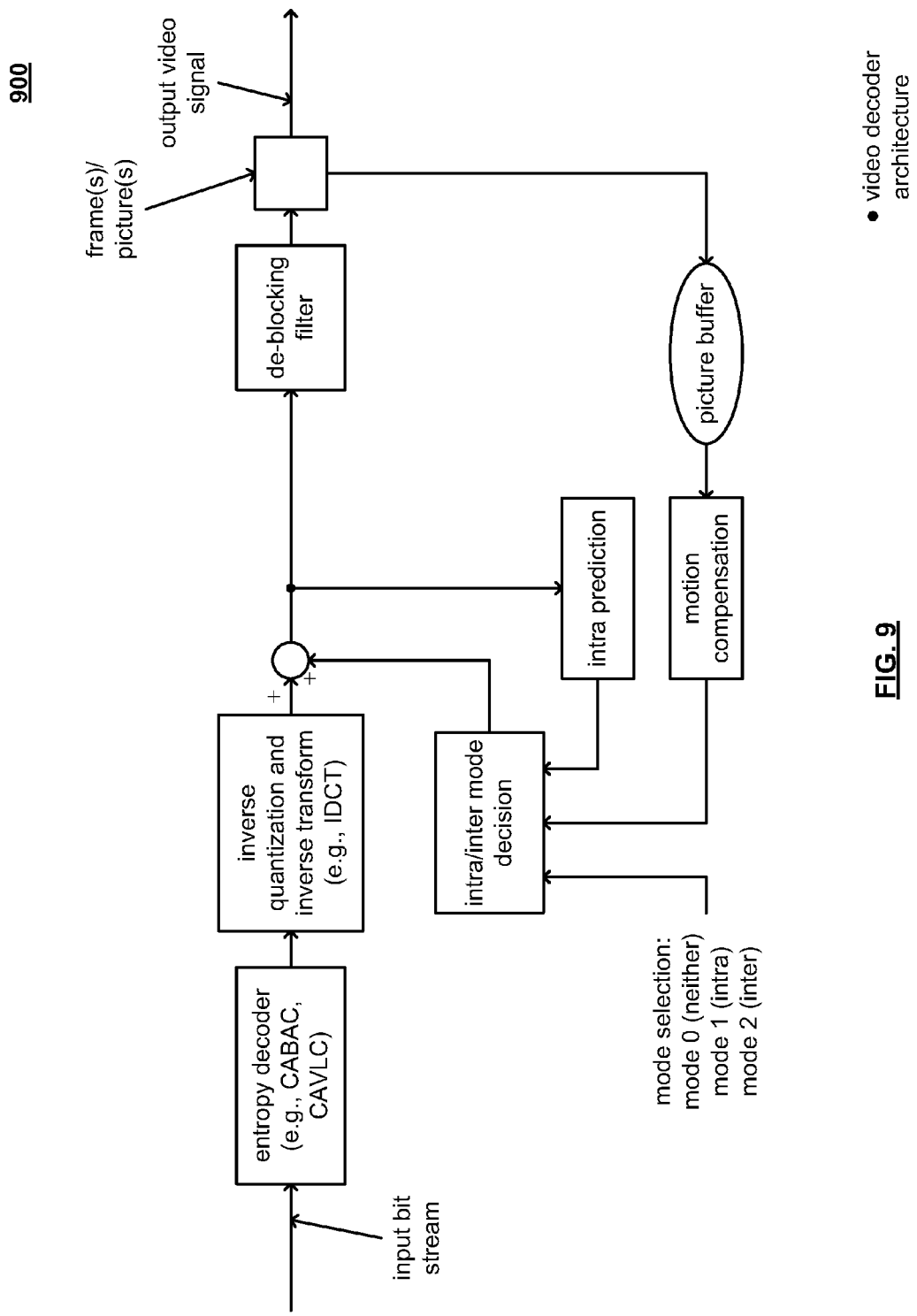
FIG. 9 and FIG. 10 are diagrams illustrating various embodiments of video decoding architectures.
Figure 10:
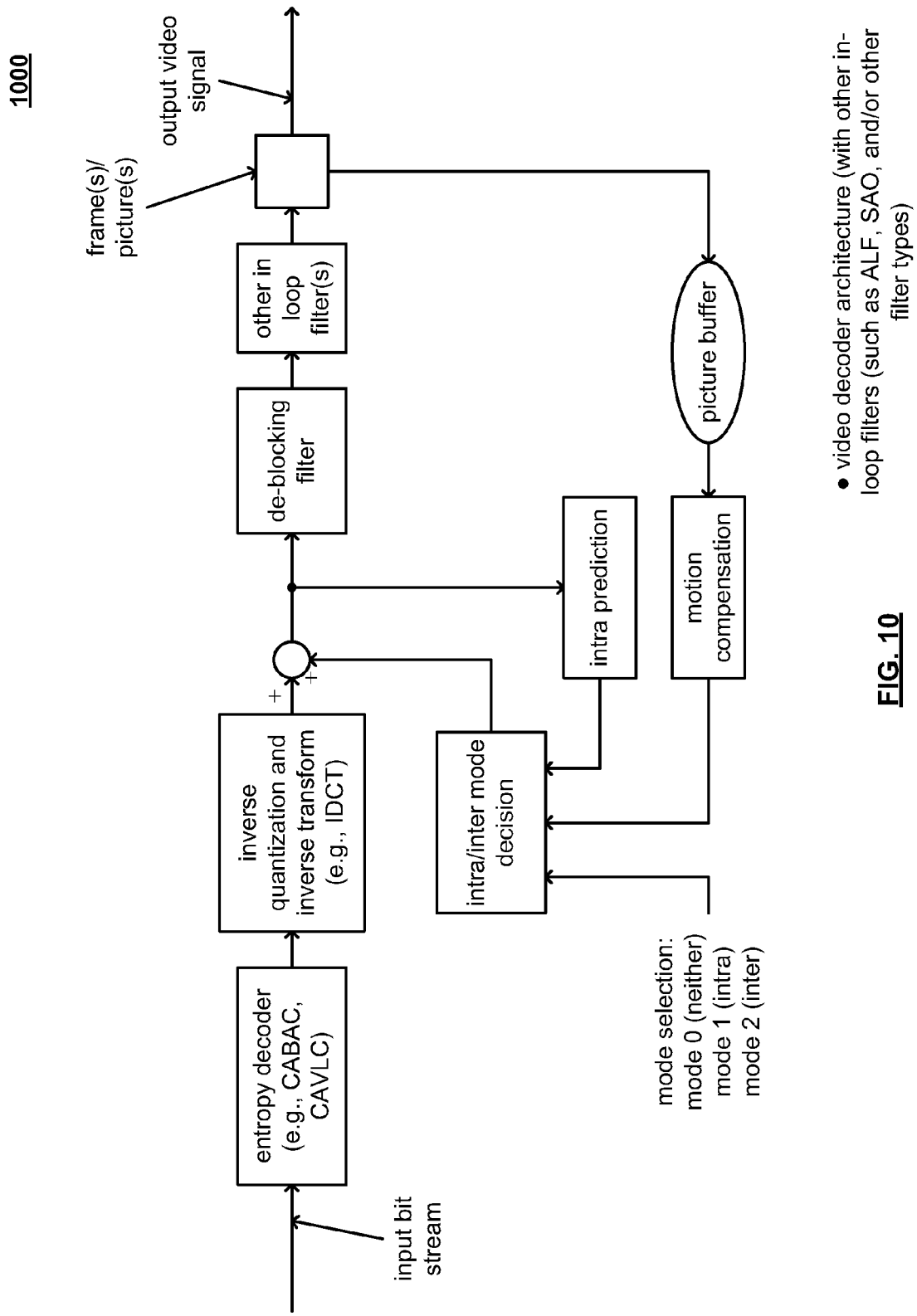

FIG. 9 and FIG. 10 are diagrams illustrating various embodiments 900 and 1000, respectively, of video decoding architectures.

Generally speaking, such video decoding architectures operate on an input bitstream. It is of course noted that such an input bitstream may be generated from a signal that is received by a communication device from a communication channel. Various operations may be performed on a continuous time signal received from the communication channel, including digital sampling, demodulation, scaling, filtering, etc. such as may be appropriate in accordance with generating the input bitstream. Moreover, certain embodiments, in which one or more types of error correction code (ECC), forward error correction (FEC), etc. may be implemented, may perform appropriate decoding in accordance with such ECC, FEC, etc. thereby generating the input bitstream. That is to say, in certain embodiments in which additional redundancy may have been made in accordance with generating a corresponding output bitstream (e.g., such as may be launched from a transmitter communication device or from the transmitter portion of a transceiver communication device), appropriate processing may be performed in accordance with generating the input bitstream. Overall, such a video decoding architectures and lamented to process the input bitstream thereby generating an output video signal corresponding to the original input video signal, as closely as possible and perfectly in an ideal case, for use in being output to one or more video display capable devices.

Referring to the embodiment 900 of FIG. 9, generally speaking, a decoder such as an entropy decoder (e.g., which may be implemented in accordance with CABAC, CAVLC, etc.) processes the input bitstream in accordance with performing the complementary process of encoding as performed within a video encoder architecture. The input bitstream may be viewed as being, as closely as possible and perfectly in an ideal case, the compressed output bitstream generated by a video encoder architecture. Of course, in a real-life application, it is possible that some errors may have been incurred in a signal transmitted via one or more communication links. The entropy decoder processes the input bitstream and extracts the appropriate coefficients, such as the DCT coefficients (e.g., such as representing chroma, luma, etc. information) and provides such coefficients to an inverse quantization and inverse transform block. In the event that a DCT transform is employed, the inverse quantization and inverse transform block may be implemented to perform an inverse DCT (IDCT) operation. Subsequently, A/D blocking filter is implemented to generate the respective frames and/or pictures corresponding to an output video signal. These frames and/or pictures may be provided into a picture buffer, or a digital picture buffer (DPB) for use in performing other operations including motion compensation. Generally speaking, such motion compensation operations may be viewed as corresponding to inter-prediction associated with video encoding. Also, intra-prediction may also be performed on the signal output from the inverse quantization and inverse transform block. Analogously as with respect to video encoding, such a video decoder architecture may be implemented to perform mode selection between performing it neither intra-prediction nor inter-prediction, inter-prediction, or intra-prediction in accordance with decoding an input bitstream thereby generating an output video signal.

Referring to the embodiment 1000 of FIG. 10, in certain optional embodiments, one or more in-loop filters (e.g., implemented in accordance with adaptive loop filter (ALF), sample adaptive offset (SAO) filter, and/or any other filter type) such as may be implemented in accordance with video encoding as employed to generate an output bitstream, a corresponding one or more in-loop filters may be implemented within a video decoder architecture. In one embodiment, an appropriate implementation of one or more such in-loop filters is after the de-blocking filter.

In accordance with various types of digital signals employed in various communication systems, one type of digital signal relates to video signals such that the signal includes video (e.g., video/image and audio data therein). In accordance with digital video compression processing within such video communication systems, there has seen great improvements in the past many years and including the last decade. Starting from MPEG-2, many variations have been proposed and one standard in particular is currently the most efficient: ITU H.264/MPEG4-AVC (e.g., as incorporated by reference herein as indicated above). However, this standard is not perfect, and there is a seemingly endless desire for improvement in video processing in any number of areas (e.g., speed, resolution, lower power consumptions, etc.).

A video stream, in its digital format, can be associated to the old style "analog film". In accordance with such an analogy, instead of a sequence of pictures imprinted on a strip of light sensitive plastic film, a digital video signal includes a "stream" of digital pictures, each picture represented by binaries numbers.

Within a modern "multimedia ecosystem", it is more desirable to provide for fast and efficient connectivity to share/send multiple audio and video content over the "network". In this view, the "network" can be any packet-based transmission, either over mobile (e.g., GPRS, GSM, etc.), cable (set top box), or modem (DSL, Internet, etc.).

The transmission of audio and video information over packet-based network is more difficult due to the opposite nature of the source (audio and video) and transmission medium (packed based lossy network).

Packet based networks can provide a high throughput of digital streams, but usually they cannot guarantee constant a low delay of transmission and constant throughput. Situations and potential challenges like network congestion on specific nodes, or high packet loss on a wireless "noisy" channel will affect the specific audio/video (A/V) encoding, and this can result in a variable-end-user experience (e.g., not ensuring a relatively constant perceptually quality level for an end user).

Audio/Video streams instead requires high bandwidth and usually low delay, especially for HD video resolution, typically correlated to the video content itself (high motion on sport scenes, high detail etc. etc.) and typically in contrast with the transmission conditions in a specific time frame.

A novel approach is presented herein by which optimization of an audio video transmission over a packet-based, lossy communication medium and to improve the end user experience. The novel approach generally is related to video digital compression. The novel approach presented herein is generally applicable to video H.264/MPEG4 part 10 (e.g., as incorporated by reference herein as indicated above), but is also applicable and can be extended to any other block-based video compression standards, protocols, and/or recommended practices (e.g., MPEG-2, among others). The novel approach presented herein oftentimes employs wireless packed based transmissions as exemplary embodiments (e.g., IP/udp), but the various aspects and principles, and their equivalents, can also be extended generally to any packet-based network transmission (regardless of the particular type of communication medium being employed such as wired, wireless, optical, etc.) over a communication channel that is lossy.

Generally speaking, a novel approaches presented herein by which frames or pictures of a video signal may be appropriately handled in accordance with a number of sub-bands or sub-frames (e.g., sub-band and sub-frame may be used interchangeably with respect to certain embodiments, diagrams, etc.) generated from each respective picture frame. For example, when processing a given frame, appropriate filtering may be performed to subsample the frame to generate a number of respective sub-frames corresponding thereto. From certain perspectives, each respective sub-frame may be viewed as being a subsample the version of the frame. It is noted that the respective sub-frames may have the same characteristics or two or more of the respective sub-frames may have different characteristics. For example, in some embodiments, each respective sub-frame may have a common size (e.g., number of pixels), aspect ratio, etc. In other embodiments, two or more of the respective sub-frames may have different respective sizes (e.g., a first respective size and a second respective size), different respective aspect ratios (e.g., a first respective aspect ratio and a second respective aspect ratio), etc.

These respective sub-frames then may undergo assembly thereby generating a reconstructed frame. This reconstructed frame may, in some embodiments, have very similar (or identical) characteristics with respect to the original frame from which the sub-frames were generated. For example, the original frame and the reconstructed frame may have a same number of pixels. In some embodiments, the addition of one or more padding pixels may be made with respect to any one or more of the respective sub-frames in accordance with generating the reconstructed frame. As may be understood with respect to a video signal including a number of pictures are frames, such respective processing may be performed with respect to any one or more of the respective frames thereof. That is to say, any one of the respective frames of a video signal may undergo appropriate processing or filtering to generate a number of sub-frames corresponding thereto.

This reconstructed frame may then undergo encoding (such as in accordance with a video encoder) to generate a corresponding at least one portion of an output bitstream. As may be understood, a given video encoder implemented to perform video encoding of the original frame may be suitably and appropriately applied for performing video encoding of the reconstructed frame as well. As may be understood with respect to a packet-based communication system, it's the encoded output bitstream (e.g., video stream) may then undergo appropriate packetization (e.g., by a packetizer, network packetizer, etc.) to generate a number of respective packets (e.g., having any desired or appropriate format including being in compliance with one or more communication protocols and/or standards, recommended practices, developing communication protocols and/or standards, etc.). Then, appropriate process a may be made to generate a signal (e.g., a continuous time signal) from the one or more packets that may be suitable for transmission via one or more communication links corresponding to one or more communication networks (e.g., including but not limited to any type of communication link, network, mutation medium, etc. as may be desired such as those described with reference to FIG. 1).

As may be appropriately understood, any incurred contiguous loss of information within a signal transmitted from a communication device operative to perform operations in accordance with any one or more of the various aspects, embodiments, and/or their equivalents, of the invention will be effectuated as a relatively sparse pixel loss in any one or more images of such a signal. That is to say, the appropriate sub-band are sub-frame handling of a frame or picture of a video signal can ensure that a loss (e.g., such as a loss of one or more packets transmitted within a packet-based communication system) will not significantly deleteriously impact perceptual quality associated with such a video signal.

Figure 11:
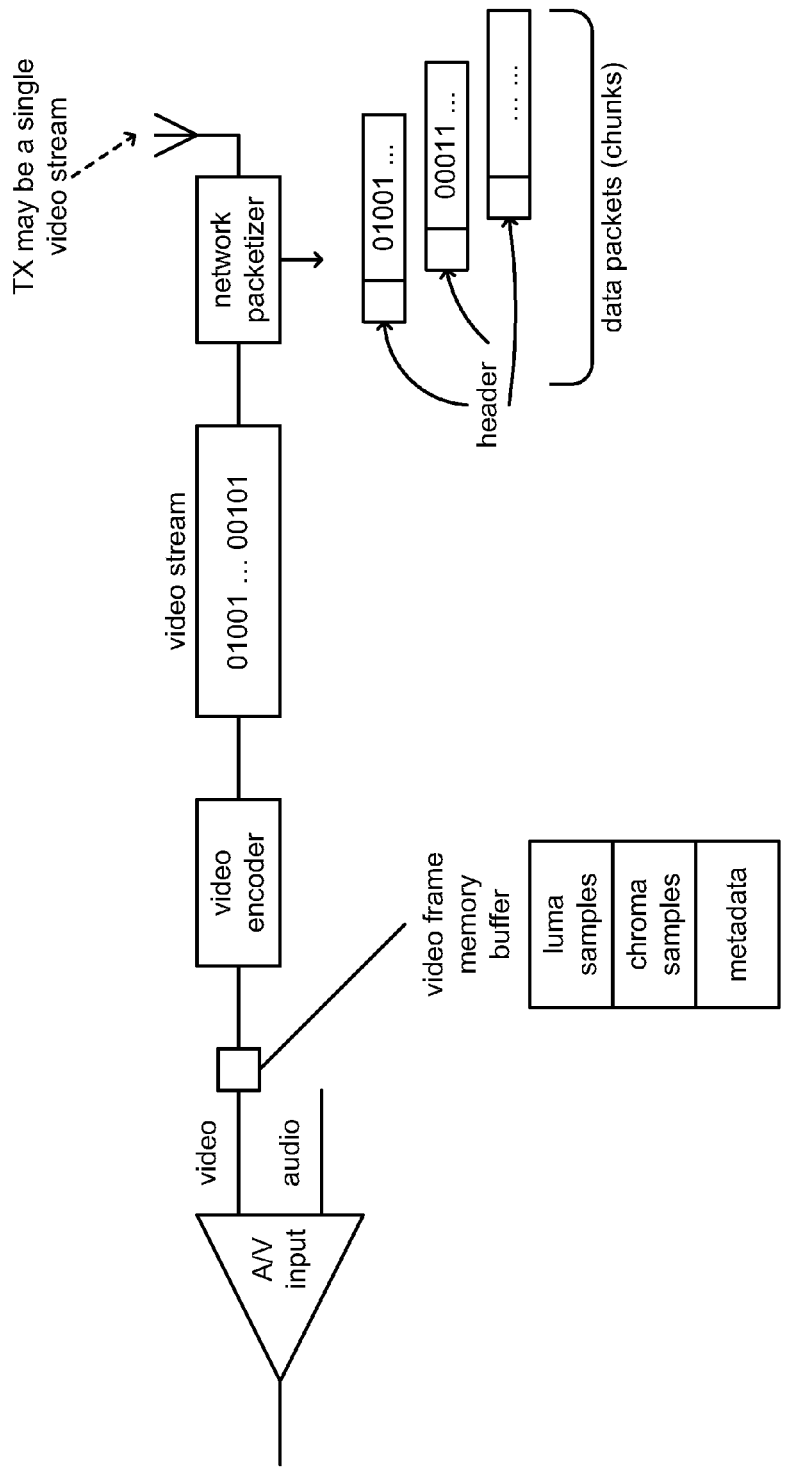
FIG. 11 illustrates an embodiment of video coding over a packet based network.

FIG. 11 illustrates an embodiment 1100 of video coding over a packet based network. In this diagram, a video coding over packet network is performed. Video is encoded in a digital format from an input source (e.g., either a frame grabber or a video transcoder). The single "video sample" is a video frame and consists of pixel data corresponding to luminance and chrominance plus some "metadata" to describe the frame itself (e.g., chroma format, time stamp, width height etc. etc.).

The sequence of captured frames is operative to be encoded into a compressed digital stream by the video encoder and sent to the network packetizer. The network layer is operative to create the correct network packet stream by creating the packet header+payload as a chunk of the incoming video stream.

It may be noted with respect to this diagram as well as with respect to others herein, while certain embodiments described herein are directed towards wireless based communication systems, such functionality, processing, etc. as presented herein may generally be applied to any desired type of communication system (e.g., wireless, wired, etc. including any type of communication systems such as those described with reference to FIG. 1). From certain perspectives, the novel approaches associated with video coding as presented herein are particularly beneficial to packet-based communication systems, though such video coding may generally be applied to any desired type of communication system.

Figure 12:
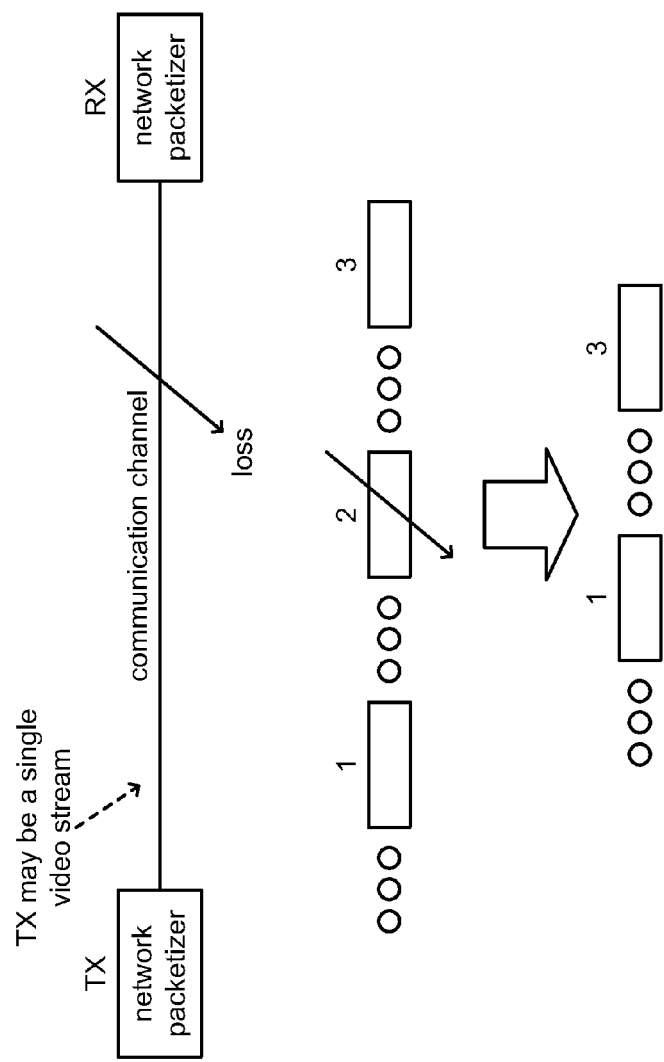
FIG. 12 illustrates an embodiment of a communication system in which at least one network packet is lost.

FIG. 12 illustrates an embodiment 1200 of a communication system in which at least one network packet is lost. This diagram shows an embodiment where one of the network packets is lost for some reason, and the receiver will not see that packet on its end of the communication channel (e.g., packet 2 is shown as being the lost packet in this embodiment).

Video error robustness/concealment is a wide topic in the technical literature. Many solutions have been proposed, and they can generally be divided into two groups. The first group is related network layer solutions that try to recover the error/packet loss at packet layer, by providing to the video decoder an error free A/V stream. These solutions usually require redundant codes and retransmissions. The second group is related to video layer solutions, especially post-processing, that will accept a corrupted video stream and try to mitigate gaps and mismatches on the decoded video frames.

As may be understood by the reader, there is not a perfect solution that may be achieved, and both of these groups (network layer solutions and video layer solutions) have their strengths and weaknesses (e.g., opposite pro/cons).

In particular, a heavy protected network layer might be very robust and resilient to errors, but usually this can reduce the constant throughput of the channel. Also, on an error burst condition, a lot of computation is spent to protect the channel real-time, while only in a few percent of the time all that protection is really needed.

For the video layer, one of the primary considerations is the overall user experience (e.g., the perceptual experience of a user). Video should appear as "smooth and natural" as possible, even under variable network conditions.

One technical consideration is real-time (or near real-time) video encoding. When video is entering the system "live", not only the packet loss, but also the channel delay, can affect the overall video quality. A clear understanding of this issue related to difference between reference and non-reference frames and between intra/inter frames of digital video encoding may assist the reader's understanding.

The reader is referred to the following, publicly available information available via the Internet: http://en.wikipedia.org/wiki/Video_compression During a real-time video encoding and transmission, a delay bigger than a frame interval over a specific packet might have the same effect of a dropped packet (lost packet). Since the decoder has to decode and present on the video every frame as they are encoded, if a packet is delayed too much over the network, it might be impossible to complete the frame in time for display. If this frame was also a reference frame for other successive frames, then a visual mismatch (artifact) may result for multiple frames on the video out.

Beside network error resilience by redundant codes (e.g., Reed-Solomon (RS), turbo coding, turbo trellis coded modulation (TTCM), low density parity check (LDPC), etc. and/or other error correction codes (ECCs) or combination thereof) and packet re-transmission multiple techniques have been proposed at video layer to mitigate video quality by improving error concealment.

The reader is referred to flexible macroblock ordering (FMO) and arbitrary slice ordering (ASO) features of the H.264 video standard: http://en.wikipedia.org/wiki/H.264/MPEG-4_AVC.

A novel approach is presented herein as related to high definition (HD) video content (e.g., either 2 k such as 720p, 1080p, or 4 k or even higher) and as related to the combination of information from the video layer to the network layer so that a better error concealment and error resilience is achievable on real-time video encoding for packet network transmission.

Also, the technique presented herein will have minimal impact (if any) on the encoder architecture of a block-based encoder type (e.g., such as in accordance with MPEG-2 or H.264) requiring only a pre/and post processor module.

Certain techniques such as ASO or FMO may have one big disadvantage, in that, they operate on a macro block type of structure (e.g., such as macro blocks being 16×16 pixels blocks within a frame). Even with sophisticated spatial-temporal filtering techniques, a perfectly optimal end-user experience may not be achievable. At least one problem is related to the fact that the minimal unit of concealment (the macro block) is typically too big also for HD resolutions. In addition, these techniques are usually very computational intensive, requiring long multi-tap FIR filters, either 1D/2D or even 3D (or higher dimensional) when previous frames are considered for macro block copy operations.

When high resolution video is provided, there exists a big amount of visual correlation and redundancy between the pixels that compose the frame itself. Video standards like H.264 leverage this property by introducing tools like the "intra prediction modes".

A novel means for leveraging such properties in favor of error robustness is presented herein by removing some of the correlation upfront by introducing one or more filters (e.g., a filter bank, one or more 2-D filters, etc.) as a pre-processing stage.

Figure 13:
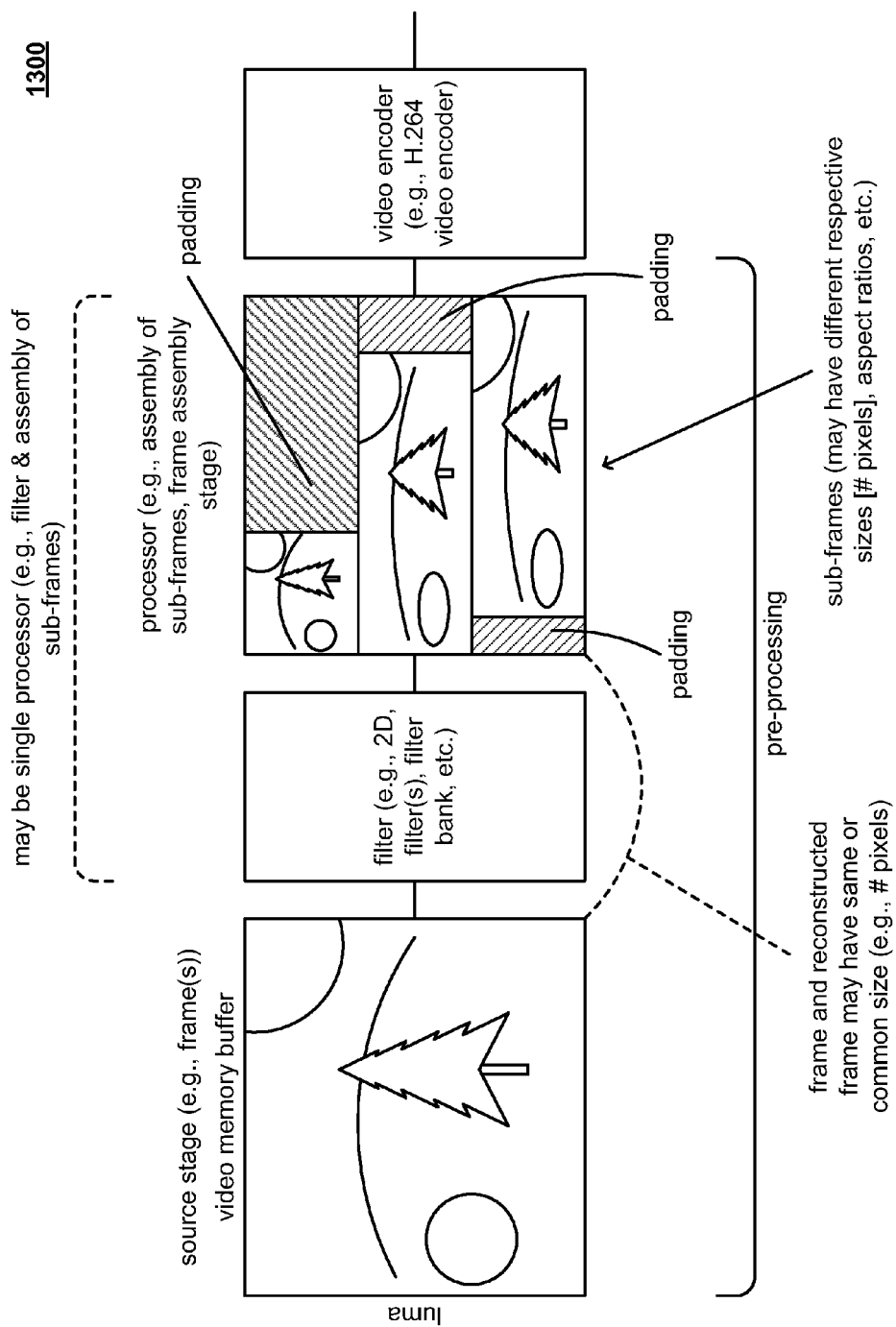
FIG. 13 illustrates an embodiment of a picture depicting a ball and a tree therein such as may be included within a video frame buffer.

FIG. 13 illustrates an embodiment 1300 of a picture depicting a ball and a tree therein such as may be included within a video frame buffer. This diagram shows a picture including a ball and a tree that are represented in the video frame buffer as an example. A filter (e.g., a two-dimensional filter, a filter or a number of filters such as may be implemented in accordance with a filter bank, etc.) is employed within one possible embodiment, but it is noted that other types may alternatively be employed without departing from the scope and spirit of the invention. The nature of such an implementation will affect the type of the reverse filter bank on the receiver side (e.g., within a receiver communication device at the other end of a communication channel from a transmitter communication device).

One novel aspect presented herein is the introduction of a frame re-assembly stage that is operative to insert proper padding (e.g., black video pixels), as desired, to proper re-format the video frame buffer for the video encoder (e.g., a H.264 video encoder).

It is important to note that the filter (e.g., each filter of a filter bank) will produce a sub-band version of the original or input picture or frame (e.g., which may be viewed as a high definition (HD) or relatively high-resolution picture in some embodiments). For example, each respective sub-band version of a picture or frame may be viewed as being a sub-sampled version or sub-frame of the original picture or frame (e.g., each respective sub-sampled version or sub-frame including relatively less information than the original picture or frame). In some embodiments, a properly designed filter bank will retain enough details and resolution to leverage all the H.264 prediction encoding tools. The higher the resolutions of the input frames, then the more efficient may the encoder operate.

It is also noted that there is not a maximum number of sub-bands to use, but it may be noted that there is a correlation between the input frame resolution, the number of sub-bands, and the efficiency of the video encoder. For example, designers are provided a great deal of latitude by which to implement a particular number of sub-bands in accordance with such video coding. In certain embodiments, such functionality may be implemented within a configurable or programmable manner such that the number of respective sub-bands employed may be adapted based upon any of a number of desired considerations (e.g., configuration or programming by a user, based upon one or more local considerations [such as device processing history, available processing resources, etc.], based upon one or more remote considerations [such as information provided from one or more remote devices, communication link status or quality, etc.]).

For example, if a relatively large number of sub-bands is performed, the amount of intra-correlation between pixels is reduced, and an encoder may not be able to compress the final output with the same efficiency of a regular, single-band (full frame), encoding.

The introduction of proper padding (as may be necessary or desired) to properly re-format the video buffer with all the sub-bands is an effective approach by which a relatively high overall system performance level may be maintained. 's It is noted that the output of the video encoder is typically a single video stream, and a video stream may be viewed as being a stream with multiple picture-in-picture frames in it.

The novel approach to performing sub-band coding presented herein provides for employing a frame assembly stage that is operative to provide a single frame (e.g., a single output stream). This can ensure there is no increase in complexity by considering multi-streams output. In other words, video coding performed in accordance with any one or more of the various aspects, embodiments, and/or their equivalents, of the invention allows for a single video stream transmission to be made from one communication device to one or more other communication devices. For example, even within implementations, architectures, systems, etc. that may include or allow as few as only one single video stream transmission, the video coding performed in accordance with any one or more of the various aspects, embodiments, and/or their equivalents, of the invention can provide for improved robustness and mitigate (if not eliminate) any deleterious effects which may be associated with loss of information during transmission via a communication link within a communication system. That is to say, robustness may be improved without requiring more than one video stream transmission to be made from one communication device to one or more other communication devices (e.g., such as compared to an implementation requiring two or more video stream transmissions).

Also, as may be understood with respect to this embodiment as well as with respect to certain other embodiments, diagrams, etc. herein, the frame and the reconstructed frame may have certain similar characteristics (e.g., a same or common size such as a same number of pixels). For example, no increase or modification of frame buffer need be made to effectuate such video coding as presented herein, in that, a reconstructed frame may be employed that has similar characteristics (e.g., a same or common size such as a same number of pixels) as the input or original input frame or picture.

Figure 14:
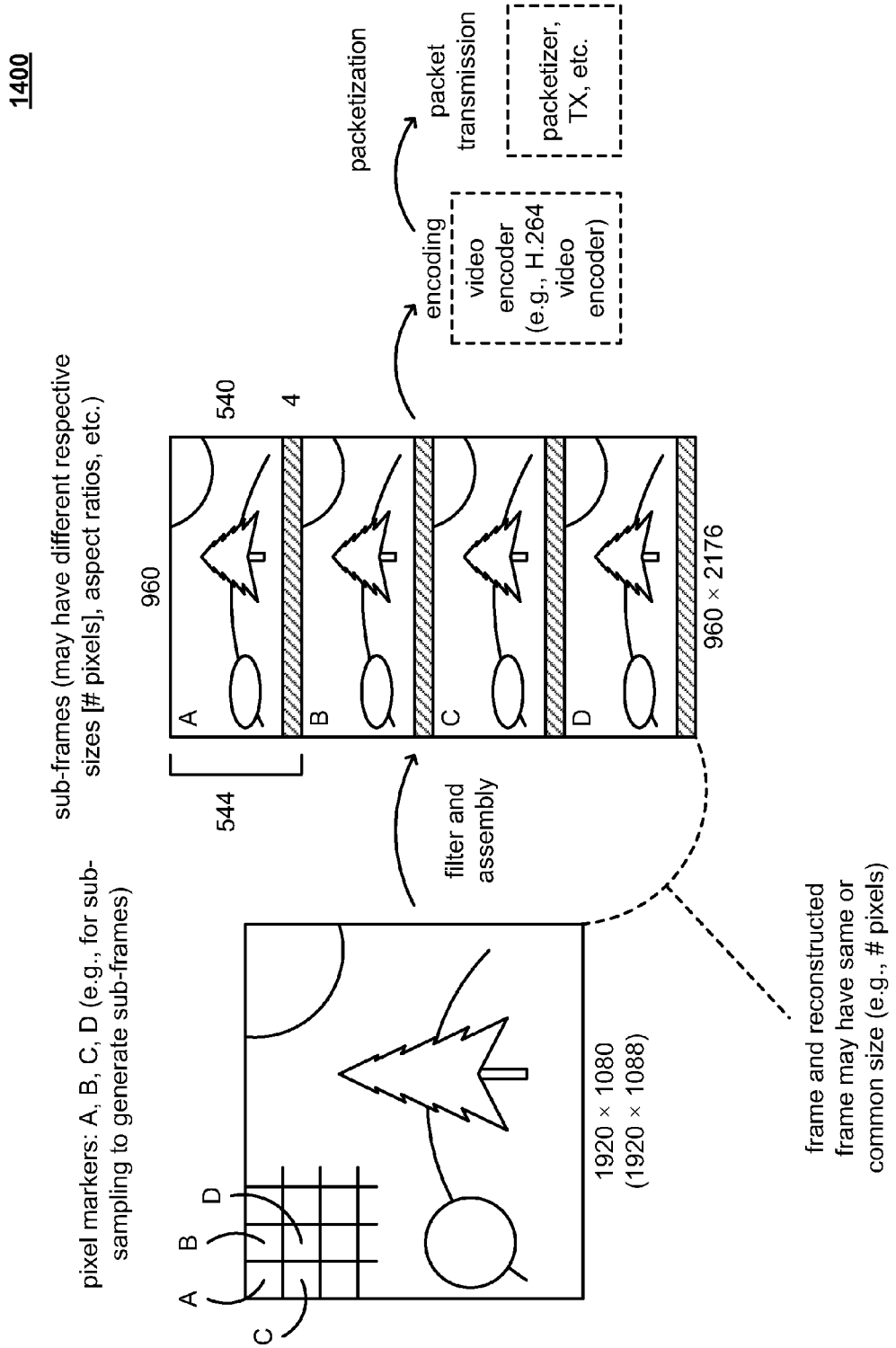
FIG. 14 illustrates an embodiment of processing of a picture.

FIG. 14 illustrates an embodiment 1400 of processing of a picture. A 1080p input video frame (e.g., 1920×1080 pixels)

is processed. In this case, the filter is a simple "pixel mask" in a checkerboard pattern that splits the pixel position (e.g., markers A, B, C, D) respectively into a number of different sub-bands. Each respective marker of such a pixel mask may be understood as beginning and performing its respective sub-sampling from a different respective starting location. From certain perspectives, the respective pixel markers may be viewed as being relatively offset with respect to one another. Considering an implementation including four respective pixel markers associated with four adjacent pixels (e.g., markers A, B, C, D), the four respective sub-samplings of the original picture would be respectively offset with respect to one another by at least one pixel. For example, the sub-sampling with respect to pixel marker B would be relatively located one pixel to the right of the sub-sampling performed with respect to the pixel marker A. Analogously, the sub-sampling with respect to pixel marker C would be relatively located one pixel below the sub-sampling performed with respect to the pixel marker A, and so on.

This is analogous to a low pass filtering with alias and phase-shift. More sophisticated methods like wavelet filtering can alternatively be used without departing from the scope and spirit of the invention, but it is noted that such sub-band processing is operative to obtain N sub-bands (e.g., where N=4 in this particular embodiment, though other values may alternatively be employed without departing from the scope and spirit of the invention). Any desired option and version of filtering may also be employed (e.g., low pass filtering with alias and phase-shift, wavelet filtering, etc.) without departing from the scope and spirit of the invention.

Once the four filtered images are assembled (and padded, if desired or necessary) to generate a reconstructed frame, the embodiment of this diagram shows a unique 960×2176 frame, ready to be encoded as a 60×136 macro blocks (e.g., each macro block being 16×16 pixels in size) picture. As may be understood with respect to this diagram, from certain perspectives, the reconstructed frame is not an exact duplicate of the original frame from which the respective sub-frames have been generated, in that, the pixels associated with the reconstructed frame are differentially ordered than the original frame from which the sub-frames have been generated. For example, while each of the respective sub-frames may be viewed as being a sub-sampled version of the original frame (e.g., and each of which may be relatively offset with respect to one another depending upon the associated pixel marker directing from where such sub-sampling should begin and be performed), the reconstructed frame may be viewed as a concatenation or assembly of the respective sub-frames. For example, with respect to this diagram, four respective sub-frames are aligned adjacently with respect to one another (including one or more padding pixels) to generate a reconstructed frame that is relatively different than the original frame from which the sub-frames have been generated. However, one or more characteristics associated with the reconstructed frame may be analogous or similar to the original frame (e.g., a common number of pixels).

To capitalize on the power of such a sub-band coding as presented herein, slice encoding can be employed. Video standards like H.264 allow the encoder to divide the picture in smaller independent and atomically decodable units called slices. Each slice is a single portion of the picture. Each slice can be encoded (by intra-mode prediction, motion compensation, any other means, etc.) and immediately packetize in one or more network packet as shown in FIG. 15.

Figure 15:
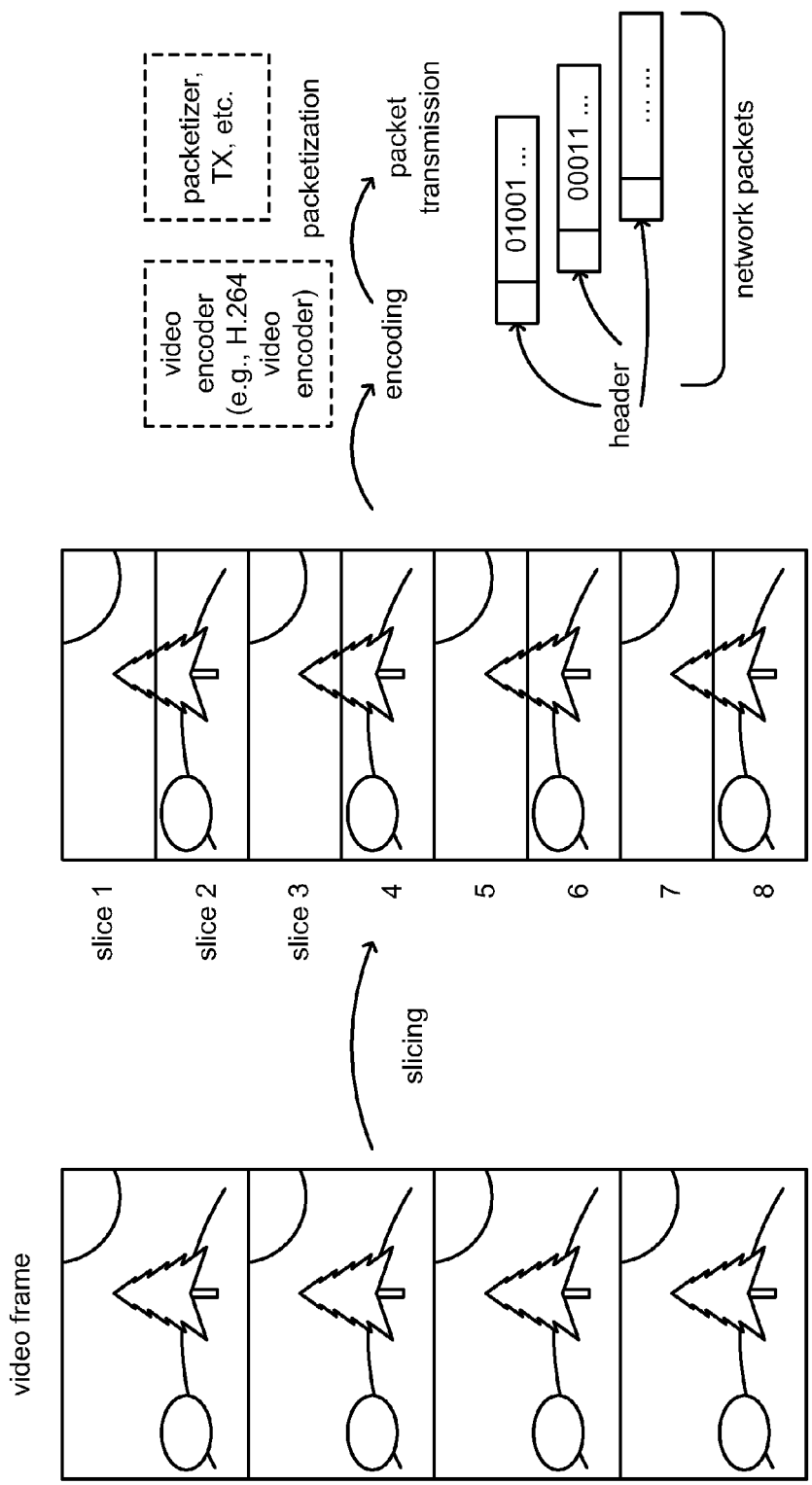
FIG. 15 illustrates an embodiment of packetization of respective slices of a picture.

FIG. 15 illustrates an embodiment 1500 of packetization of respective slices of a picture. At least one advantage of this sub-band/slice encoding is error resilience and delay resilience allowing better reconstruction on lossy channels. Generally speaking, any subdivision of a video frame into a number of respective portions (e.g., slices, tiles, etc. and/or any other division thereof) may benefit from the sub-band or sub-frame encoding in accordance with any one or more of the various aspects, embodiments, and/or their equivalents, of the invention.

Figure 16:
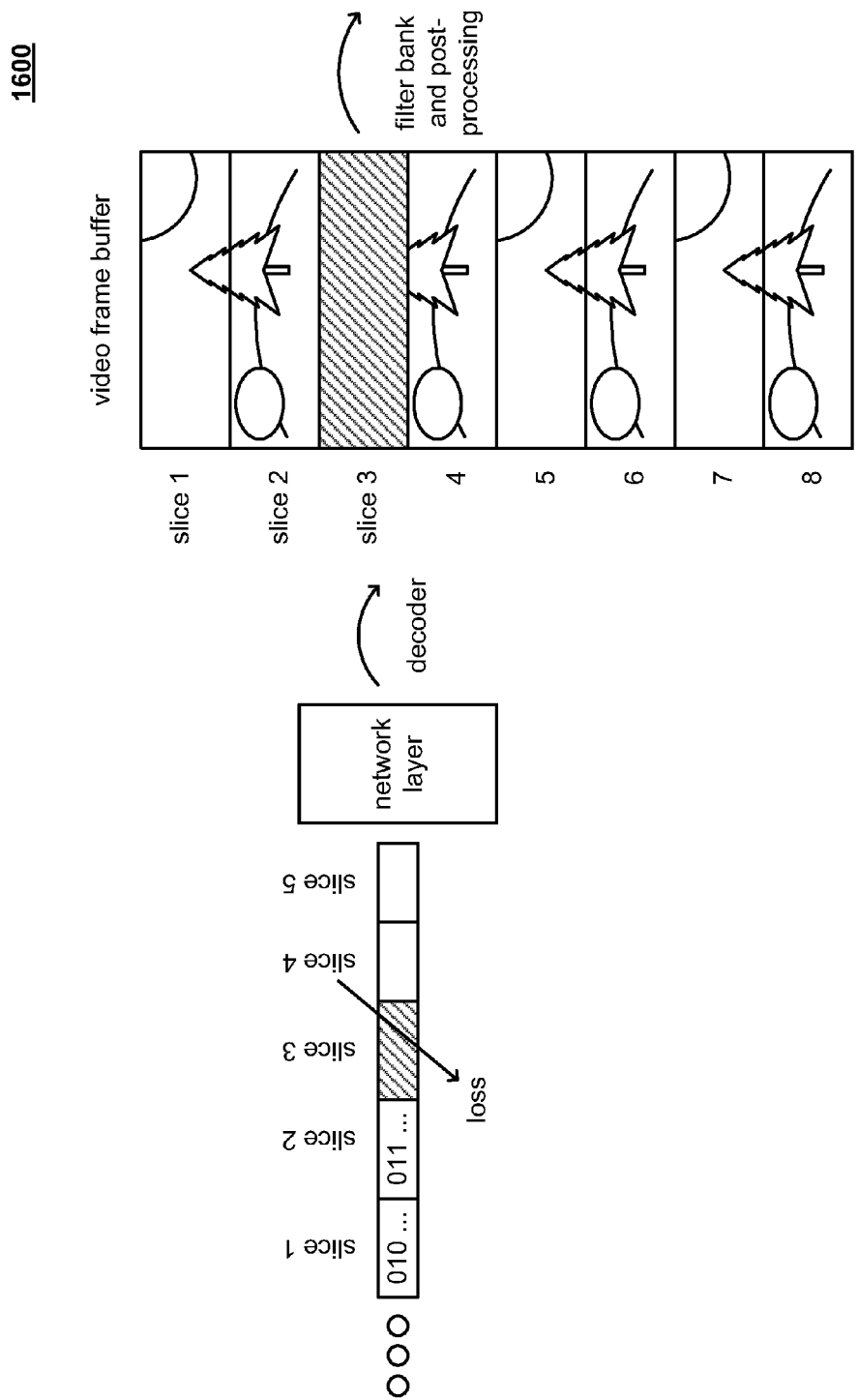
FIG. 16 illustrates an embodiment of a receiver communication device operating on a received signal in which at least one slice has been lost.

FIG. 16 illustrates an embodiment 1600 of a receiver communication device operating on a received signal in which at least one slice has been lost. This diagram shows the receiver side (e.g., of a receiver communication device) of the same case is presented in a packet loss case.

Due to a packet loss, one of the slices is fully corrupted. In a "normal" encoding architecture, this loss of a packet will a very visible impact on the final video output, affecting the end-user video experience.

In this embodiment, after the decoder, an (inverse) filter bank and post-processing stage are implemented that are operative to re-combine the single sub-bands in the original image (with artifacts) and fill the missing pixels using a simple finite impulse response (FIR) filter.

Figure 17:
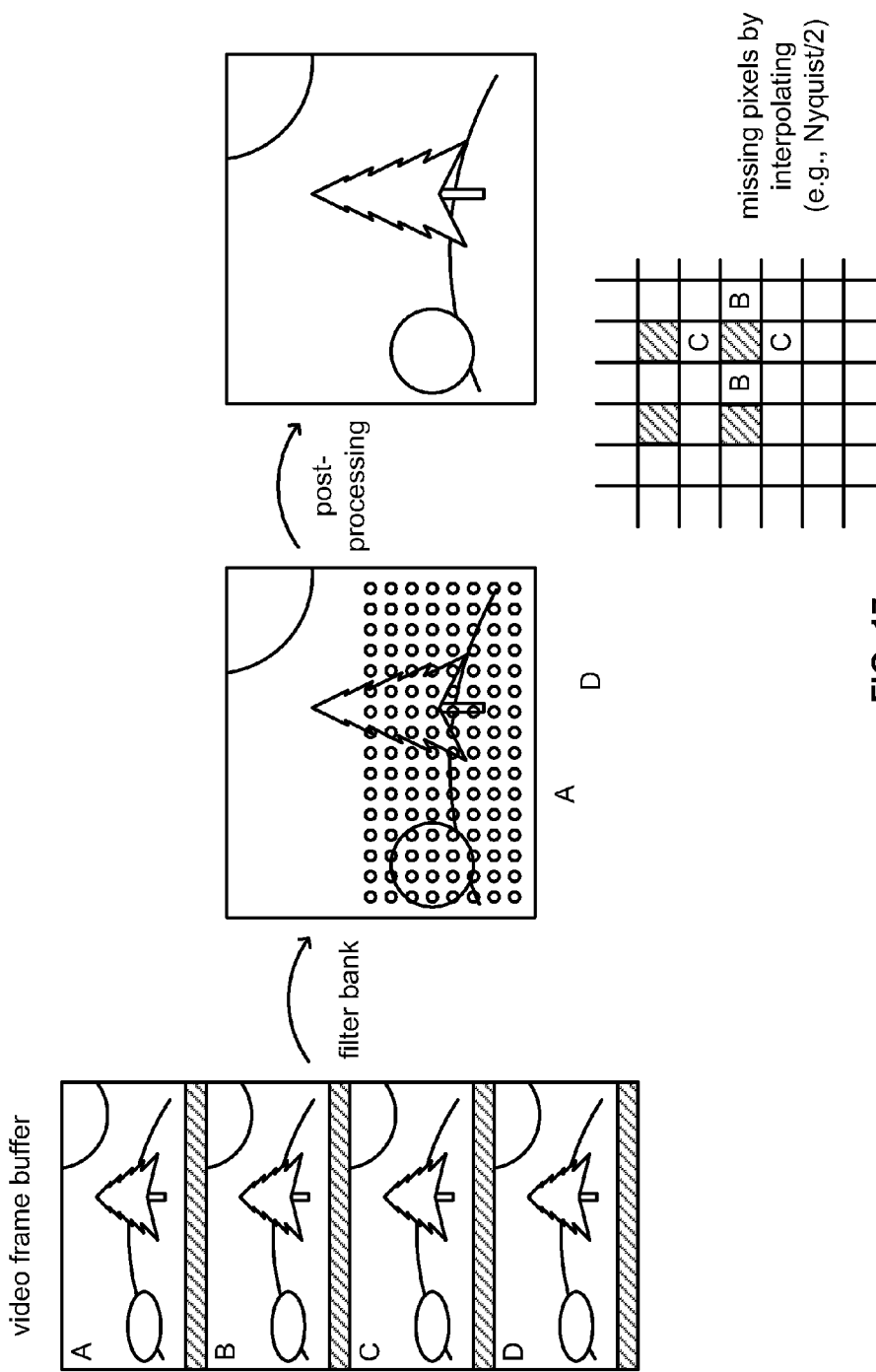
FIG. 17 illustrates an embodiment of processing of a received signal and interpolation for generating estimates of lost pixels within at least one picture therein.

FIG. 17 illustrates an embodiment 1700 of processing of a received signal and interpolation for generating estimates of lost pixels within at least one picture therein. In the embodiment of this diagram, the reconstruction filter bank is a simple pixel gather operation that is operative to re-create the original image even if some of the pixels are missing. Now, the post-processing can perform interpolation filtering (e.g., using very short interpolation, like a simple diamond 2 tap FIR filter) and reconstruction of the missing pixels in the video buffer.

It is noted that, since the proper number of sub-band has been used (e.g., N=4 in this embodiment), the encoder is still operative to leverage enough pixel correlation to efficiently compress the image.

Also, it noted that by calibrating the number of video slices, packet loss maybe recovered in a way that is less visible to the end user (e.g., does not affect the perceptual experience of the user too badly).

The interpolation in this case provides a less visible affect that techniques like ASO or FMO because, by using sub-bands, the error on a spatial frequency has been shifted near to Nyquist/2, which is the highest video frequency represented in such a pixel based video frame buffer in accordance with any one or more of the various aspects, embodiments, and/or their equivalents, of the invention.

While the error is still relevant, it is now on a less visible (by human perception) frequency, and for this reason, a less sophisticated interpolation method is operative to provide very good perceptual results.

Increasing the complexity of filter and post processing stage will of course increase the fidelity of the result such trade-offs may be made in accordance with designer choice and as desired in a particular application.

This technique also allows a more efficient audio/video sync and control. If some packets of a picture are too late for the time the picture must be put on the output display, we can consider those one or more packets as lost, interpolate and continue decoding with a minimal artifact on the video, and keeping an optimal A/V sync for the optimal end-user experience.

Figure 18:
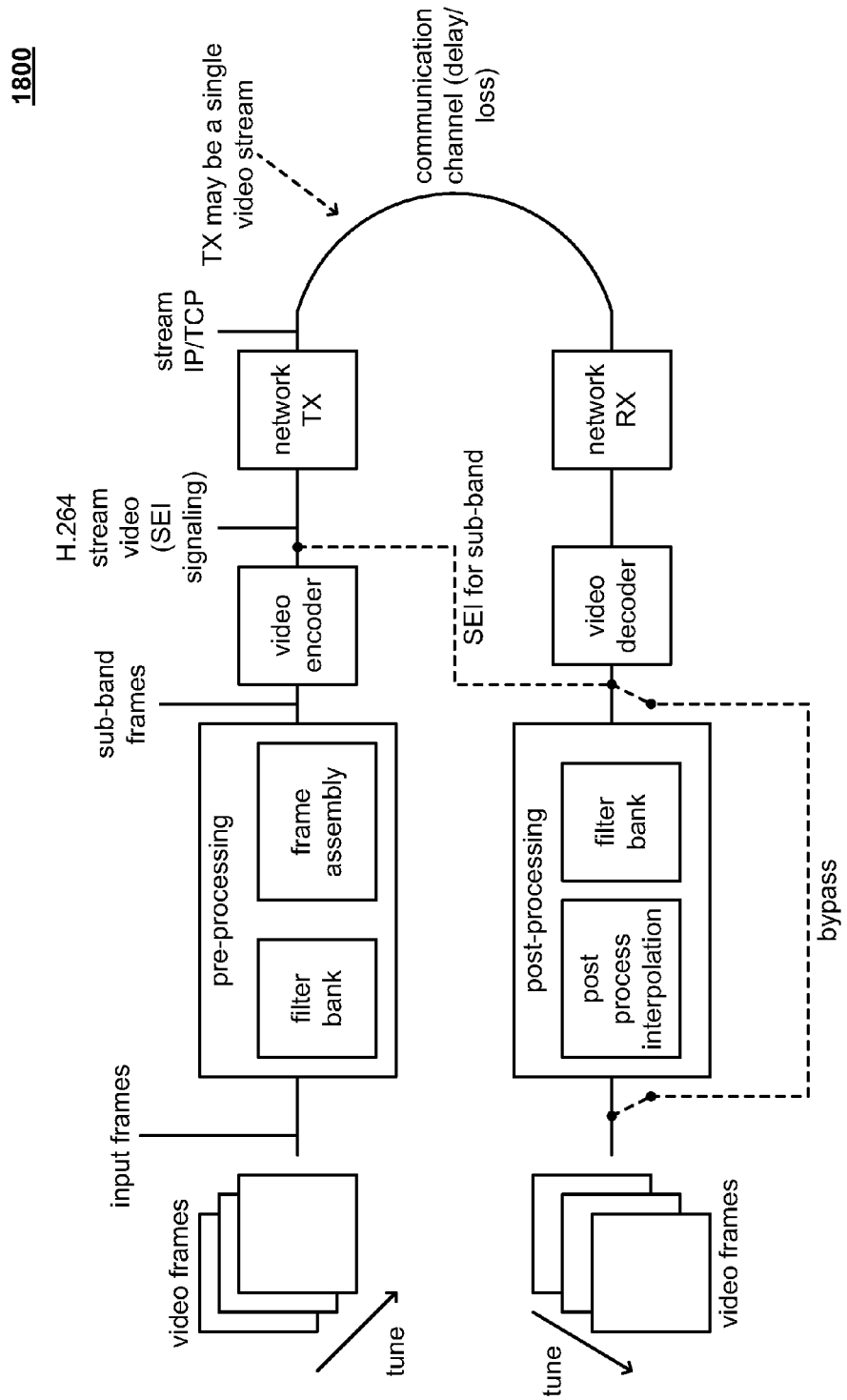
FIG. 18 illustrates an embodiment of a video coding system.

FIG. 18 illustrates an embodiment 1800 of a video coding system. This diagram is related to a special SEI (e.g., the reader is referred to H.264 user defined Supplemental Enhancement Information (SEI) definition) can be used to signal that the stream has been produced by sub-band coding, so that the decoder can decide if bypass or apply the post processing stage.

Figure 19:
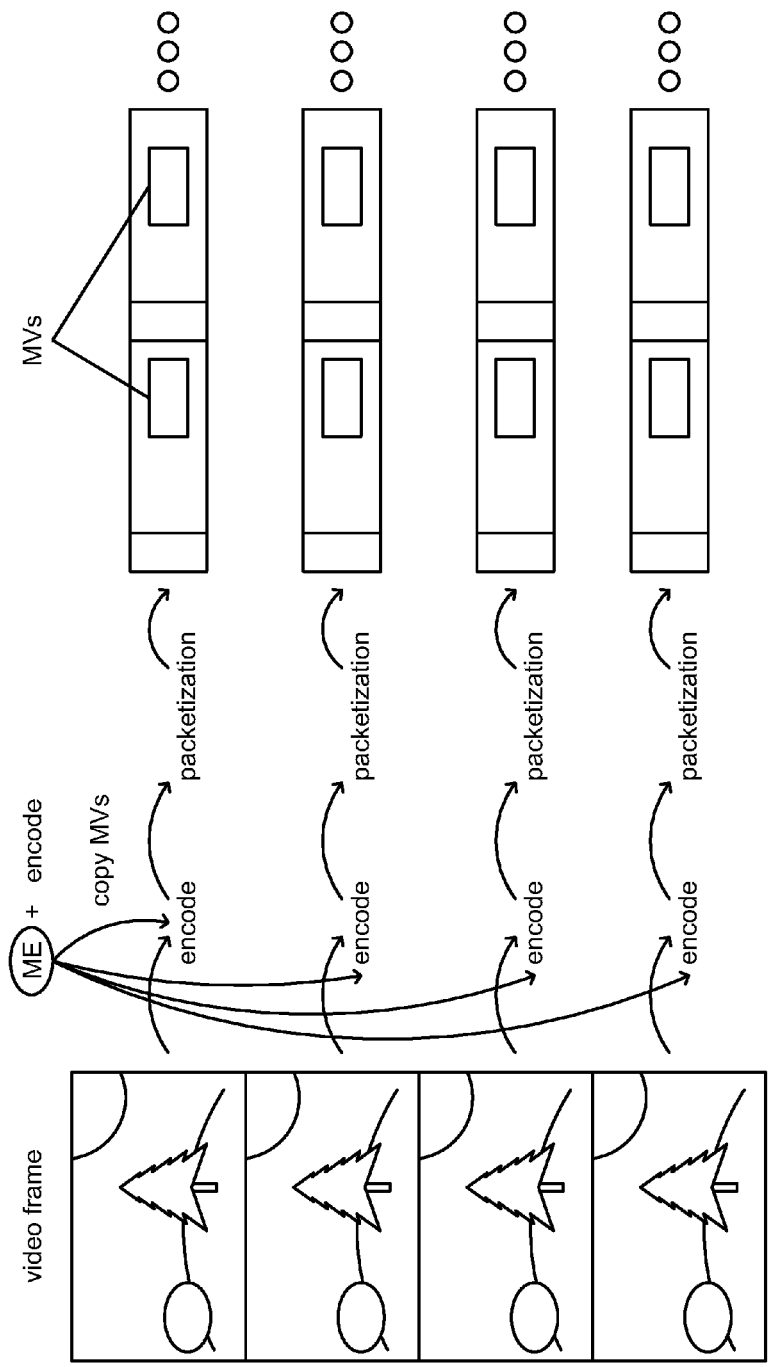
FIG. 19 illustrates an embodiment of employing at least one motion vector commonly in accordance with more than one packet.

FIG. 19 illustrates an embodiment 1900 of employing at least one motion vector commonly in accordance with more than one packet. This diagram shows a means by which leveraging network layer resilience may be performed in accordance with partial motion estimation (PME).

By using the sub-band coding, the network layer can be offloaded heavily from protecting the stream all of the time. Sometimes, a high throughput network may have "patterns" of errors, and these patterns may exhibit a burst error behavior. By enabling sub-band coding, the network layer is then operative to run at maximum speed (with fewer error resilience) thereby shifting the responsibility to protect data to the efficiency of concealment at the video layer.

It is noted that not all the parts of a video stream are the same: some are more important than others, and particularly in accordance with performing video processing thereof. For example video headers, with height and width information, are vital and should be sent over secure non-loss channel (e.g., such as TCP/IP). Also, "motion vector information" maybe useful important to reconstruct P and B frames type (e.g., see H.264 definitions for non I/IDR frames).

H.264 has introduced the "data-partitioning" tool to identify such logically different part of the stream.

Data partitioning allows the network layer to send higher priority information like motion vectors with more robust error resilience (or different modulation in the case of a radio channel). By using sub-band coding and by leveraging the high resolution of our input frame, the architecture of the encoder and final stream may be improved and the complexity thereof simplified.

FIG. 19 illustrates an embodiment of employing at least one motion vector commonly in accordance with more than one packet. Referring back to any of the various embodiments of video encoding (e.g., FIG. 4, FIG. 5, FIG. 6, etc.), one or more video encoding operations (e.g., motion estimation) can be applied on only one sub-band (e.g., applied only to the portion of a reconstructed frame that is associated with one of the sub-frames generated there from), and those packets can be sent over the communication channel with more robust transmission and signaling to the decoder that the motion vector of the other sub-bands or sub-frames are the same of the one just sent. That is to say, such processing (e.g., motion estimation) may be performed with respect to one of the sub-frames generated from the original frame or picture, and the resultant(s) generated thereby (e.g., motion vector(s)) generated by processing that one of the sub-frames is used for all of the other respective sub-frames associated with that original frame or picture.

The trade off on motion compensation efficiency/residuals may be mitigated by the amount of computation for motion estimation and by the robustness of the schema.

Figure 20:
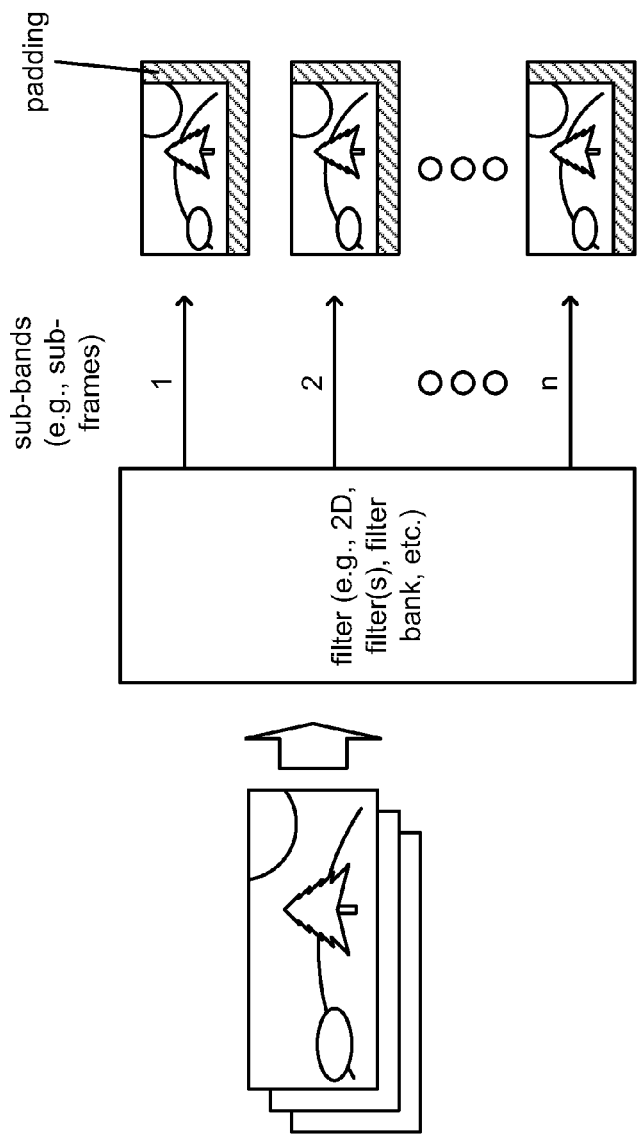
FIG. 20 illustrates an embodiment of sub-sampling of a frame to generate a plurality of sub-frames.

FIG. 20 illustrates an embodiment 2000 of sub-sampling of a frame to generate a plurality of sub-frames. As may be seen with respect to this diagram, a filter is implemented to perform generation of a number of respective sub-bands (e.g., sub-frames). Considering operation associated with one given picture frame, the filter (which may be implemented as a two dimensional filter, one or more filters, a filter bank, etc.) is implemented to generate any of a number of respective sub-bands or sub-frames there from. Generally speaking, any respective picture frame of a video signal may have a corresponding number of respective sub-bands (e.g., sub-frames). Any one or more of the respective sub-frames may be generated using one or more padding pixels (e.g., a black value pixel). As may be seen with respect to this diagram, the respective sub-frames generated from a given picture or frame are of common shape and size. Considering and implementation in which for respective sub-bands or sub-frames are employed, it may be seen that a relatively higher resolution video signal (e.g., such as a 1080p video signal which may have a frame resolution of 1920×1080 which is delivered at a rate of 60 frames per second) may undergo appropriate filtering to generate a number of respective sub-bands or sub-frames such that each respective one of them has a relatively lower frame resolution (e.g., such as 960×560 which is delivered at a rate of 60 frames per second).

Figure 21:
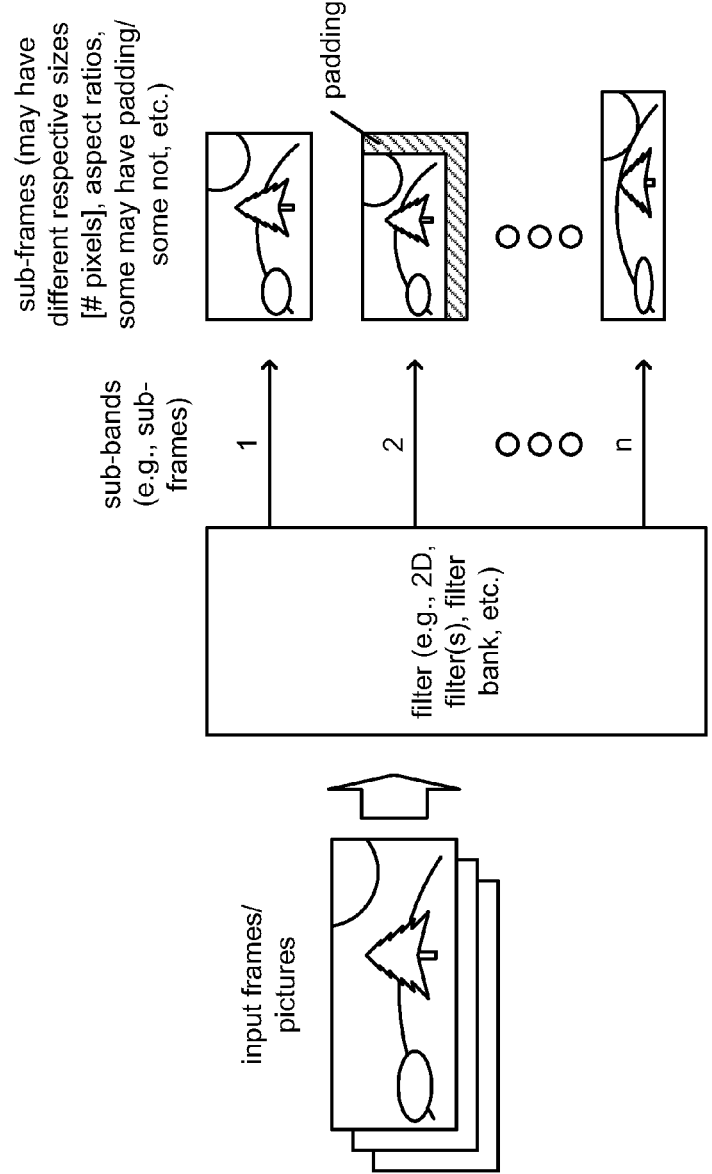
FIG. 21 illustrates an alternative embodiment of sub-sampling of a frame to generate a plurality of sub-frames.

FIG. 21 illustrates an alternative embodiment 2100 of sub-sampling of a frame to generate a plurality of sub-frames. Considering this diagram, it may be seen that each respective sub-band or sub-frame may be generated having individual and different characteristics. For example, any two or more respective sub-frames generated from a given original frame may have different respective characteristics (e.g., sizes such as number of pixels, aspect ratios, including are not including padding pixels, etc.). Generally speaking, a great degree of latitude may be provided with respect to generating the respective sub-bands or sub-frames associated with the pictures or frames of a given video signal. In addition, the manner in which such sub-band or sub-frame processing is performed may be adaptive, in that, a first one or more parameters may be employed during a first period of time, a second one or more parameters may be employed during a second period of time, and so on and such adaptation may be performed based upon any of a number of considerations (e.g., one or more user settings, one or more local and/or remote considerations, etc.). Generally, characteristics associated with generating any one respective sub-band or sub-frame may be similar or different to those associated with generating any other respective sub-band or sub-frame.

Figure 22:
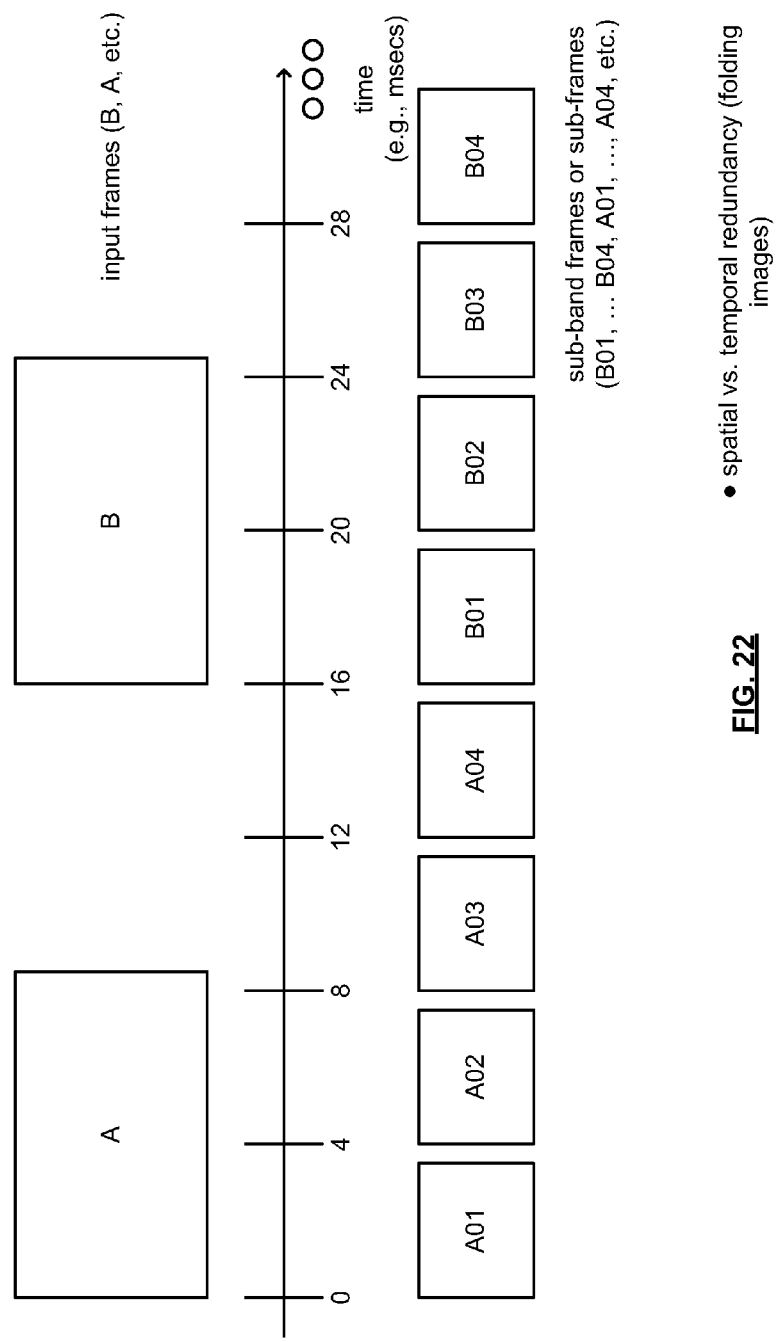
FIG. 22 illustrates an embodiment of spatial vs. temporal redundancy (folding images).

FIG. 22 illustrates an embodiment 2200 of spatial vs. temporal redundancy (folding images). As may be understood with respect to this diagram, a given original frame may undergo appropriate sub-band or sub-frame processing to generate a number of respective and corresponding sub-bands or sub-frames. While other embodiments, diagrams, etc. herein operate to generate a reconstructed frame that undergoes subsequent video encoding for transmission via a communication channel, each respective sub-band or sub-frame may alternatively undergo video encoding for transmission via a communication channel. While the use of a reconstructed frame as described herein operates to ensure spatial resiliency among any given reconstructed frame, additional temporal resiliency may be provided as well by individually transmitting the respective sub-bands or sub-frames generated from any given original frame.

Figure 23:
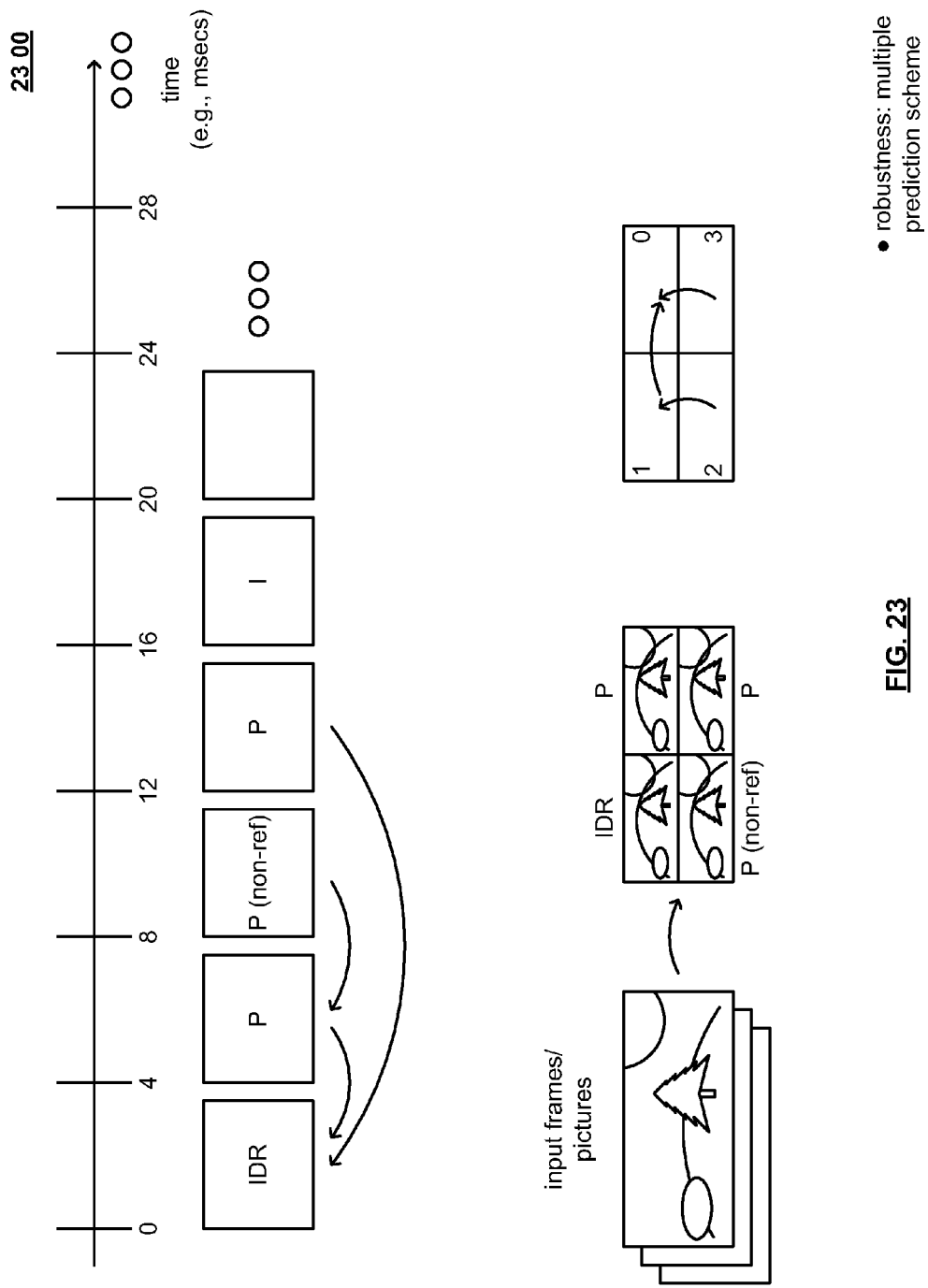
FIG. 23 illustrates an embodiment of appropriate handling and/or re-ordering of sub-frames.

FIG. 23 illustrates an embodiment 2300 of appropriate handling and/or re-ordering of sub-frames. When transmitting respective and corresponding sub-bands or sub-frames, it is noted that various types of frames are typically employed within a given video frame sequence (e.g., P-frames, I-frames including IDR-frames, P-frames (that are not employed as reference frames, etc.), and given that each respective sub-band or sub-frame corresponds to one corresponding portion of an original frame, appropriate handling of the transmitted and received sub-bands or sub-frames should be made in order to reassemble an appropriate version of the original frame at the receiving end of a communication link. For example, depending upon the interrelationship between the respective frames that are transmitted from a given communication device (e.g., noting that such 'frames' in fact correspond to sub-bands or sub-frames in such an embodiment), appropriate handling of those received sub-bands or sub-frames should be made in a receiving device.

Figure 24:
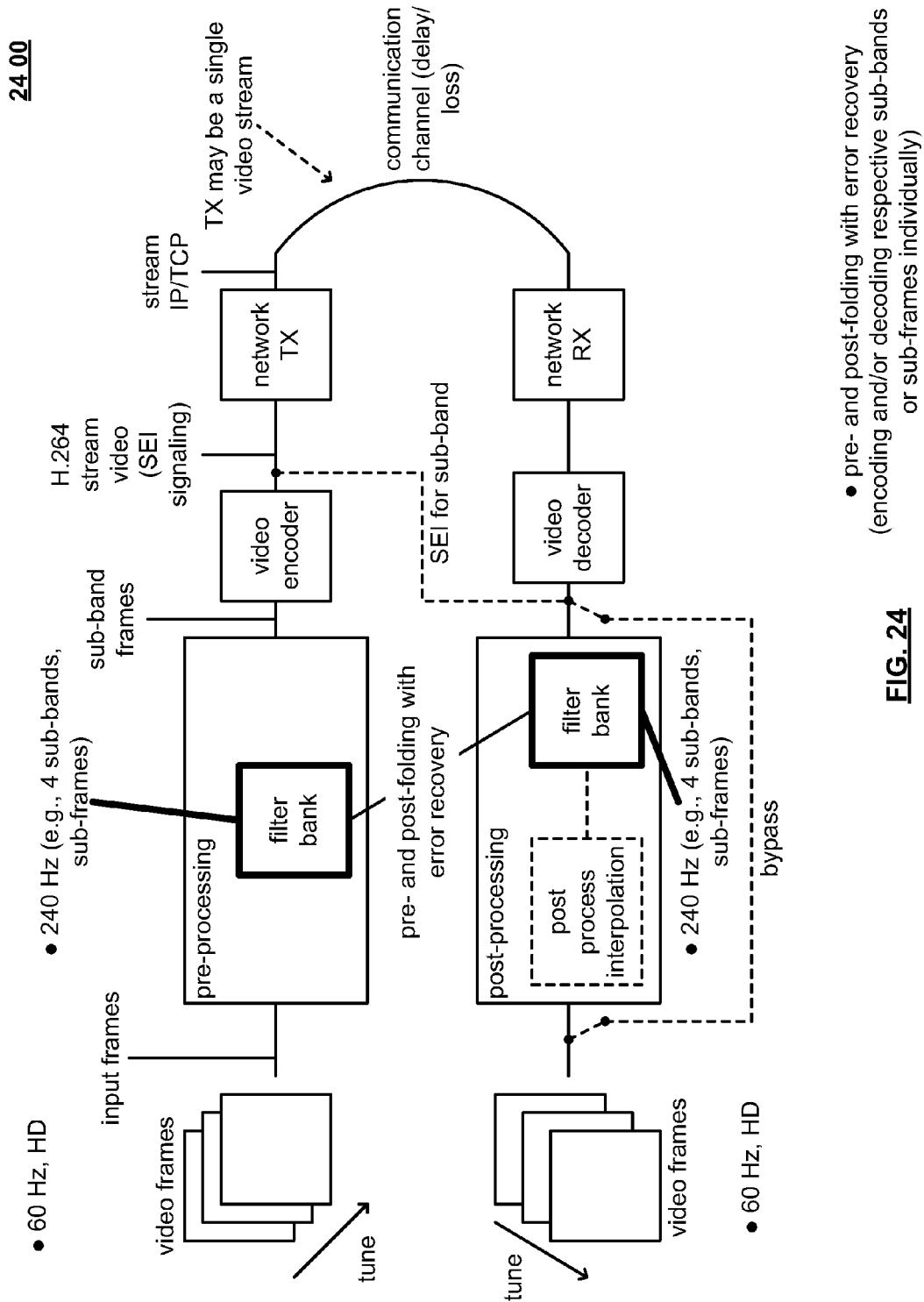
FIG. 24 illustrates an alternative embodiment of a video coding system (e.g., including pre- and post-folding with error recovery).

FIG. 24 illustrates an alternative embodiment 2400 of a video coding system (e.g., including pre- and post-folding with error recovery). While other embodiments, diagrams, etc. herein are implemented to generate a reconstructed image from a number of respective sub-bands or sub-frames associated with an original image, this diagram shows how each respective sub-band or sub-frame may be individually encoded and transmitted. That is to say, such a video encoder may be implemented to perform video encoding of each respective sub-band or sub-frame in alternative embodiments. Instead of employing a video encoder to encode a reconstructed frame (that has been generated from a number of respective sub-bands or sub-frames), such a video encoder may instead be implemented to perform video encoding of each respective sub-band or sub-frame. Appropriate handling on a receiver end of a communication channel may be effectuated as well, in that, the received signal will include a number of respective encoded sub-bands or sub-frames as opposed to a number of respective encoded reconstructed frames.

Figure 25:
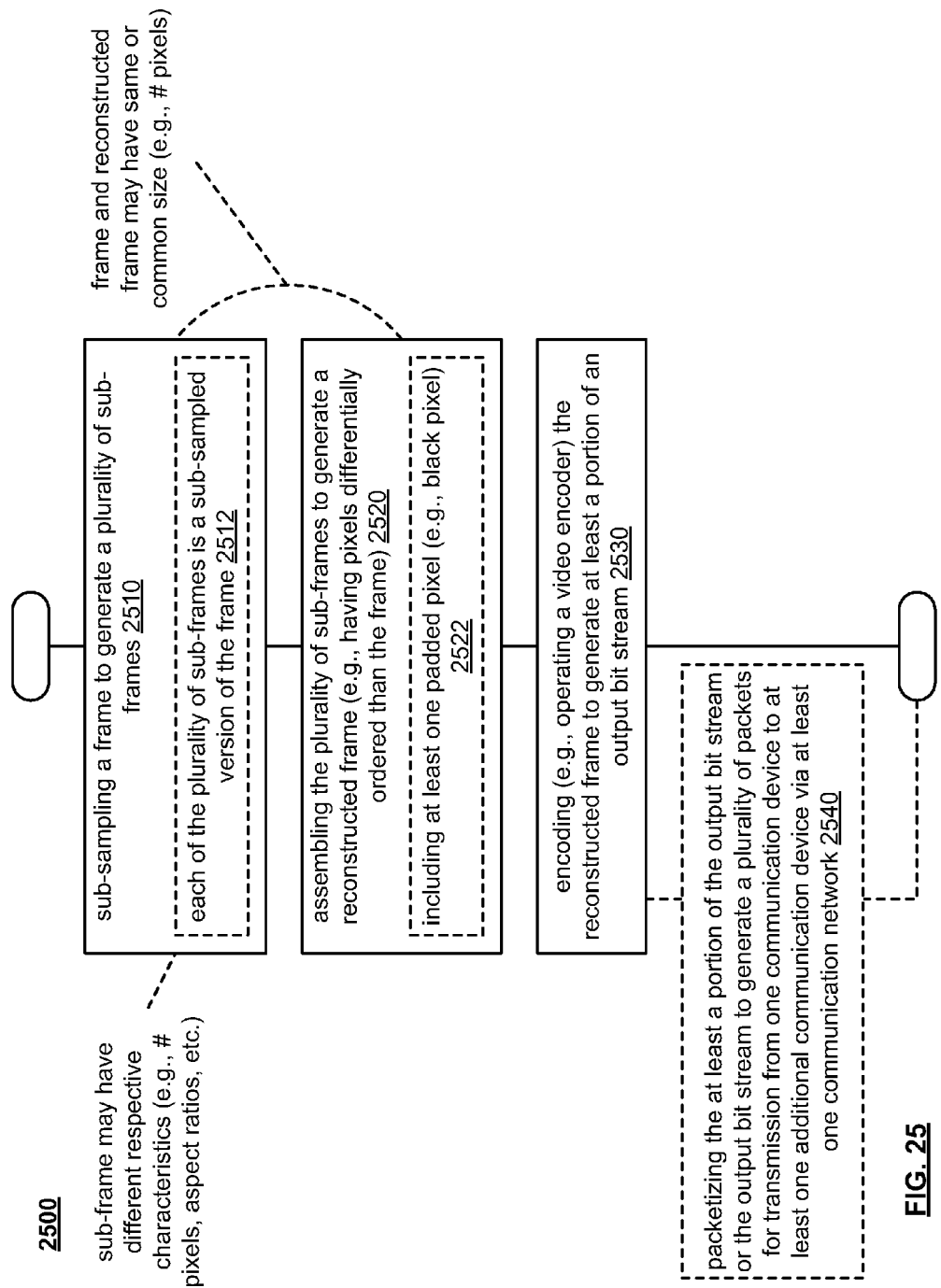
FIG. 25, FIG. 26, and FIG. 27 illustrate various embodiments of method for performing video processing (e.g., such as within one or more communication devices).
Figure 26:
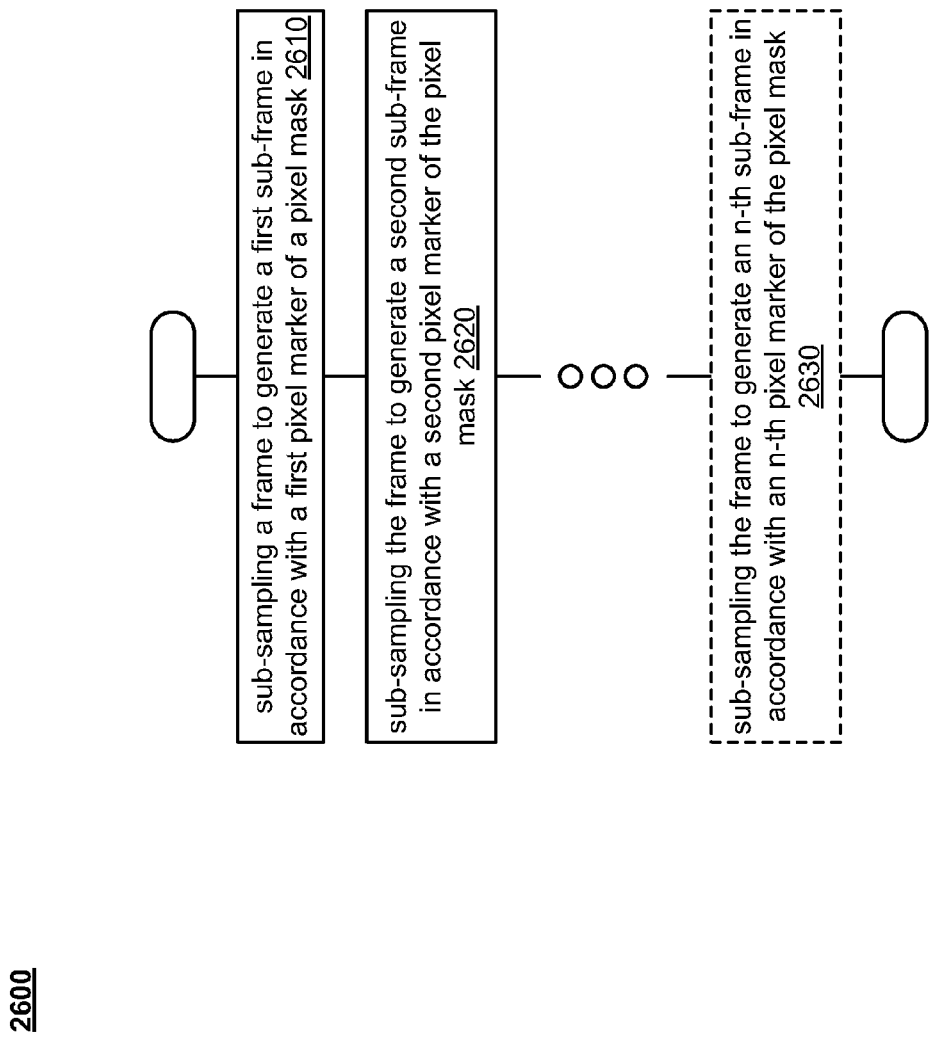
Figure 27:
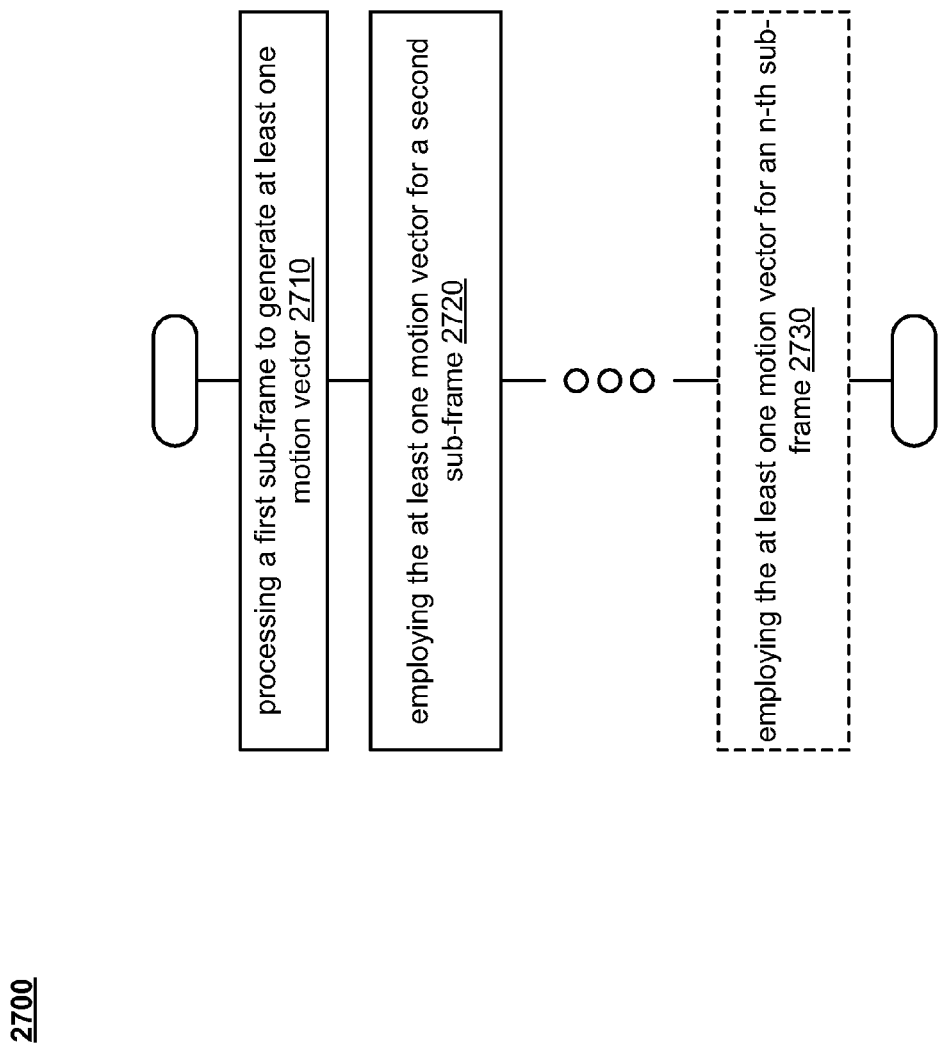

FIG. 25, FIG. 26, and FIG. 27 illustrate various embodiments of method for performing video processing (e.g., such as within one or more communication devices).

Referring to method 2500 of FIG. 25, the method 2500 begins by sub-sampling a frame to generate a plurality of sub-frames, as shown in a block 2510. In some embodiments, each respective one of the plurality of sub-frames may be viewed as a subsampled version of the frame, as shown in a block 2512. It is further noted that if a respective sub-frames may have different respective characteristics (e.g., number of pixels, aspect ratios, etc.).

The method 2500 continues by assembling the plurality of sub-frames to generate a reconstructed frame, as shown in a block 2520. From certain perspective, the reconstructed frame is not a duplicate of the frame (e.g., original frame) from which the plurality of sub-frames has been generated. For example, the reconstructed frame has pixels differentially ordered than the frame (e.g., spatially and differentially ordered with respect to the frame (e.g., original frame) from which the plurality of sub-frames has been generated).

As may be understood, the reconstructed frame has different respective spatial characteristics than the original frame that undergoes sub-sampling. However, as may be understood with respect to this embodiment as well as with respect to certain other embodiments, the frame and the reconstructed frame may have certain similar characteristics (e.g., a same or common size such as a same number of pixels). In some embodiments, the method 2500 also operates by including at least one padded pixel (e.g., a black pixel) in accordance with assembling the plurality of sub-frames to generate a reconstructed frame, as shown in a block 2522 which may operate in conjunction with block 2520.

The method 2500 then operates by encoding (e.g., such as by operating a video encoder) the reconstructed frame to generate at least a portion of an output bitstream, as shown in a block 2530.

In some alternative embodiments, the method 2500 continues by packetizing the at least a portion of the output bitstream or the output bitstream itself to generate a plurality of packets for transmission from one communication device to at least one additional communication device the at least one communication network, as shown in a block 2540.

Referring to method 2600 of FIG. 26, the method 2600 begins by sub-sampling a frame to generate a first sub-frame in accordance with a first pixel marker of a pixel mask, as shown in a block 2610. The method 2600 continues by sub-sampling the frame to generate a second sub-frame in accordance with a second pixel marker of the pixel mask, as shown in a block 2620.

Depending upon the size of a pixel mask, operations associated with the method 2600 may continue correspondingly. For example, considering a pixel mask including n respective pixel markers, the method 2600 may then operate by sub-sampling the frame to generate an n-th sub-frame in accordance with an n-th pixel marker of the pixel mask, as shown in a block 2630.

Referring to method 2700 of FIG. 27, the method 2700 begins by processing a first sub-frame to generate at least one motion vector, as shown in a block 2710. The method 2700 continues by employing the at least one motion vector for a second sub-frame, as shown in a block 2720.

Depending upon the number of sub-frames (e.g., considering up to n sub-frames), the method 2700 may operate by also employing the at least one motion vector for an n-th sub-frame, as shown in a block 2730.

As may be understood with respect to the method 2700 FIG. 27, motion estimation (e.g., such as in accordance with generating one or more motion vectors) is described as being performed with respect to one sub-frame and applied to other respective sub-frames. However, any other desired video encoding operation may also appropriately be performed with respect to one given sub-frame and applied to other respective sub-frames without departing from the scope and spirit of the invention (e.g., motion estimation including generating one or more of motion vectors is presented as an illustrative an exemplary embodiment for illustration to the reader, though other respective video encoding operations may be handled similarly).

It is also noted that the various operations and functions as described with respect to various methods herein may be performed within a communication device, such as using a baseband processing module and/or a processing module implemented therein and/or other component(s) therein.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device comprising:
   a communication interface; and
   a processing circuit, the processing circuit and the communication interface configured to:
   sub-sample a frame to generate a plurality of sub-frames, wherein each of the plurality of sub-frames is a respective sub-sampled version of a full version of the frame, wherein a first sub-frame of the plurality of sub-frames is a first sub-sampled version of the full version of the frame based on a first pixel marker, and a second sub-frame of the plurality of sub-frames is a second sub-sampled version of the full version of the frame based on a second pixel marker that is offset from the first pixel marker;

assemble the plurality of sub-frames to generate a reconstructed frame having pixels differentially ordered than the frame, wherein the reconstructed frame includes the first sub-frame and the second sub-frame adjacently arranged; and encode the reconstructed frame to generate at least a portion of an output bit stream; and transmit the output bit stream to another communication device.

2. The communication device of claim 1, wherein the frame and the reconstructed frame each include a common number of pixels.

3. The communication device of claim 1, wherein the processing circuit and the communication interface are further configured to:

assemble the plurality of sub-frames with at least one padded pixel to generate the reconstructed frame, wherein the reconstructed frame includes the first sub-frame, the second sub-frame, and the at least one padded pixel adjacently arranged.

4. The communication device of claim 1, wherein the processing circuit and the communication interface are further configured to:

packetize the output bit stream to generate a plurality of packets for transmission to the another communication device via a lossy communication channel.

5. The communication device of claim 1, wherein:

the first sub-frame includes a first number of pixels and a first aspect ratio; and the second sub-frame includes a second number of pixels and a second aspect ratio.

6. The communication device of claim 1, wherein the processing circuit and the communication interface are further configured to:

sub-sample the frame to generate the plurality of sub-frames using a pixel mask applied based on the first pixel marker and the second pixel marker.

7. The communication device of claim 1, wherein the processing circuit and the communication interface are further configured to:

perform motion estimation processing based on only a portion of the reconstructed frame corresponding to the first sub-frame or the second sub-frame to generate at least one motion vector for use in both the first sub-frame and the second sub-frame.

8. The communication device of claim 1, wherein the processing circuit and the communication interface are further configured to:

support communications within at least one of a satellite communication system, a wireless communication system, a wired communication system, a fiber-optic communication system, or a mobile communication system.

9. The communication device of claim 1, wherein the reconstructed frame includes the first sub-frame of the plurality of sub-frames in a first portion of the reconstructed frame and the second sub-frame of the plurality of sub-frames in a second portion of the reconstructed frame that is non-overlapping and different than the first portion of the reconstructed frame.

10. The communication device of claim 1, wherein the processing circuit and the communication interface are further configured to:

sub-sample the frame using a first at least one parameter to generate the first sub-frame of the plurality of sub-frames; and sub-sample the frame using a second at least one parameter to generate the second sub-frame of the plurality of sub-frames.

11. The communication device of claim 1, wherein the processing circuit and the communication interface are further configured to:

packetize the output bit stream to generate a plurality of packets for transmission, to the another communication device, wherein each packet of the plurality of packets includes a respective header and a respective payload.

12. A method for execution by a communication device, the method comprising:

sub-sampling a frame to generate a plurality of sub-frames, wherein each of the plurality of sub-frames is a respective sub-sampled version of a full version of the frame, wherein a first sub-frame of the plurality of sub-frames is a first sub-sampled version of the full version of the frame, and a second sub-frame of the plurality of sub-frames is a second sub-sampled version of the full version of the frame;

assembling the plurality of sub-frames to generate a reconstructed frame having pixels differentially ordered than the frame, wherein the reconstructed frame includes the first sub-frame and the second sub-frame adjacently arranged; and encoding the reconstructed frame to generate at least a portion of an output bit stream; and transmitting, via a communication interface of the communication device, the output bit stream to another communication device.

13. The method of claim 12 further comprising:

assembling the plurality of sub-frames with at least one padded pixel to generate the reconstructed frame, wherein the reconstructed frame includes the first sub-frame, the second sub-frame, and the at least one padded pixel adjacently arranged.

14. The method of claim 12 further comprising:

packetizing the output bit stream to generate a plurality of packets; and transmitting, via the communication interface of the communication device, the plurality of packets to the another communication device via a lossy communication channel.

15. The method of claim 12, wherein:

the first sub-frame includes a first number of pixels and a first aspect ratio; and the second sub-frame includes a second number of pixels and a second aspect ratio.

16. The method of claim 12 further comprising:

sub-sampling the frame to generate the plurality of sub-frames in accordance with a pixel mask applied based on a first pixel marker and a second pixel marker, wherein the first sub-frame of the plurality of sub-frames is the first sub-sampled version of the full version of the frame based on the first pixel marker, and the second sub-frame of the plurality of sub-frames is the second sub-sampled version of the full version of the frame based on the second pixel marker that is offset from the first pixel marker.

17. The method of claim 12 further comprising:

performing motion estimation processing based on only a portion of the reconstructed frame corresponding to the first sub-frame or the second sub-frame to generate at least one motion vector for use in both the first sub-frame and the second sub-frame.

18. The method of claim 12, wherein the communication device is operative within at least one of a satellite communication system, a wireless communication system, a wired communication system, a fiber-optic communication system, or a mobile communication system.

19. The method of claim 12, wherein the reconstructed frame includes the first sub-frame of the plurality of sub-frames in a first portion of the reconstructed frame and the second sub-frame of the plurality of sub-frames in a second portion of the reconstructed frame that is non-overlapping and different than the first portion of the reconstructed frame.

20. The method of claim 12 further comprising:
   sub-sampling the frame using a first at least one parameter to generate the first sub-frame of the plurality of sub-frames; and
   sub-sampling the frame using a second at least one parameter to generate the second sub-frame of the plurality of sub-frames.

* * * * *